United States Patent [19]

Seth-Smith et al.

[11] Patent Number: 4,890,321
[45] Date of Patent: Dec. 26, 1989

[54] COMMUNICATIONS FORMAT FOR A SUBSCRIPTION TELEVISION SYSTEM PERMITTING TRANSMISSION OF INDIVIDUAL TEXT MESSAGES TO SUBSCRIBERS

[75] Inventors: Nigel Seth-Smith; Cameron Bates; Samson Lim; William van Rassel; Robert Yoneda, all of Toronto; Keith Lucas, Richmond Hill, all of Canada

[73] Assignee: Scientific Atlanta, Inc., Atlanta, Ga.

[21] Appl. No.: 253,320

[22] Filed: Sep. 30, 1988

Related U.S. Application Data

[63] Continuation of Ser. No. 883,310, Jul. 8, 1986, abandoned.

[51] Int. Cl.$^4$ ............... H04N 7/167; H04N 7/10; H04N 7/04
[52] U.S. Cl. .................................... 380/20; 358/86; 358/145; 358/147; 380/21; 455/4; 455/6
[58] Field of Search ............ 380/APS 20, 21, 23, 380/25; 455/4, 6; 358/86, 142, 145, 147; 370/60

[56] References Cited

U.S. PATENT DOCUMENTS

| | | | |
|---|---|---|---|
| 4,205,343 | 5/1980 | Barrett | 380/18 |
| 4,245,245 | 1/1981 | Matsumoto et al. | 380/20 |
| 4,292,650 | 9/1981 | Hendrickson | 380/20 |
| 4,361,852 | 11/1982 | Katzfey | 358/145 |
| 4,388,645 | 6/1983 | Cox et al. | 358/147 |
| 4,393,404 | 7/1983 | Cox et al. | 358/147 |
| 4,484,027 | 11/1984 | Lee et al. | 380/20 X |
| 4,531,020 | 7/1985 | Wechselberger et al. | 380/21 |
| 4,531,021 | 7/1985 | Bluestein | 380/21 |
| 4,536,791 | 8/1985 | Campbell et al. | 380/10 |
| 4,577,332 | 3/1986 | Brenig | 371/69 X |
| 4,600,921 | 7/1986 | Thomas | 380/18 X |
| 4,603,349 | 7/1986 | Robbins | 380/20 |
| 4,613,901 | 9/1986 | Gilhousen et al. | 380/20 |
| 4,636,854 | 1/1987 | Crowther et al. | 380/20 |
| 4,694,491 | 9/1987 | Horne et al. | 380/20 |
| 4,739,510 | 4/1988 | Jeffers et al. | 380/15 |
| 4,768,228 | 8/1988 | Clupper et al. | 380/20 |

OTHER PUBLICATIONS

Lowry, "B-MAC: An Optimum Format for Satellite Television Transmission", SMPTE Journal, Nov., 1984, pp. 1034–1043.
The CCIR Study Group Report Document 10–11S/106–E of Sep. 23, 1983.
Chouinard et al., "NTSC and MAC Television Signals in Noise and Interference Environments", SMPTE Journal, Oct. 1984, pp. 930–949.

*Primary Examiner*—Thomas H. Tarcza
*Assistant Examiner*—Linda J. Wallace
*Attorney, Agent, or Firm*—Banner, Birch, McKie & Beckett

[57] ABSTRACT

A subscription television system in which individual decoders are enabled to receive individually addressed messages is disclosed. The composite signal, including video and teletext, also comprises addressed packets which are detected by decoders and which indicate that a message addressed to a particular subscriber is forthcoming, and system control data. In a preferred embodiment, both addressed packets and teletext are encrypted. The addressed packet is decrypted using a decoder-specific code and a transmitted code, while the teletext message is decrypted using a decryption key contained in the system control data. The teletext message cannot be received until the addressed packet has been decrypted. Therefore, redundant levels of security are provided to the system. Messages for display to the user can be selected in response to user initiated commands, in response to decoder initiation, or in response to the transmitter.

13 Claims, 19 Drawing Sheets

| | |
|---|---|
| 1 | FULL FIELD MODE SELECT |
| 2 | KEY SOURCE CODE |
| 1 | ENCRYPTED PROGRAM |
| 2 | SEGMENT ID |
| 8 | PROGRAM TIER NUMBER |
| 4 | SERVICE TIER NUMBER |
| 12 | PROGRAM NUMBER |
| 8 | COST OF CURRENT PROGRAM |
| 14 | DECRYPTION KEY (1ST SEGMENT) |
| 1 | FAST SCRAMBLING SELECT |
| 9 | DECRYPTION KEY (2ND SEGMENT) |
| 62 | |

FIG.10

PACKET A OF
SYSTEM DATA

| Bits | Field |
|---|---|
| 32 | DECRYPTION KEY (3$^{RD}$ SEGMENT) |
| 8 | BLACKOUT CODE |
| 1 | PROGRAM COST (MSB) |
| 5 | CHECK BITS |
| 1 | FINGERPRINT TRIGGER |
| 1 | IMPULSE ENABLE |
| 5 | AUDIO/DATA CHANNEL USAGE |
| 3 | PROGRAM RATING |
| 2 | ACTIVE VIDEO USAGE |
| 1 | GENERAL MESSAGE |
| 1 | SOURCE SWITCH REQUEST |
| 1 | SCRAMBLED PROGRAM |
| 1 | TRACKED PROGRAM |

PACKET B OF SYSTEM DATA

PACKET C OF SYSTEM DATA

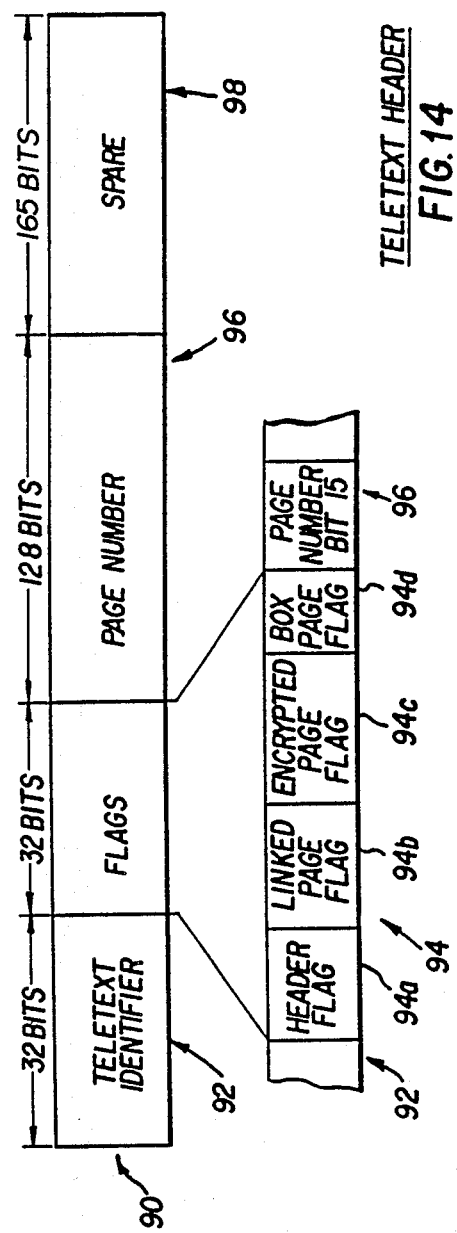
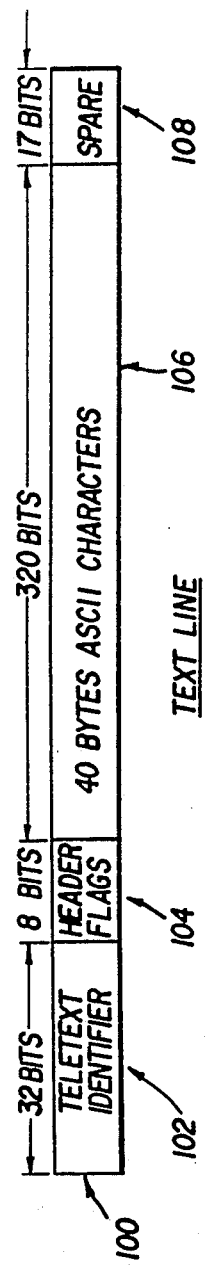
TELETEXT HEADER
FIG. 14
FIG. 15

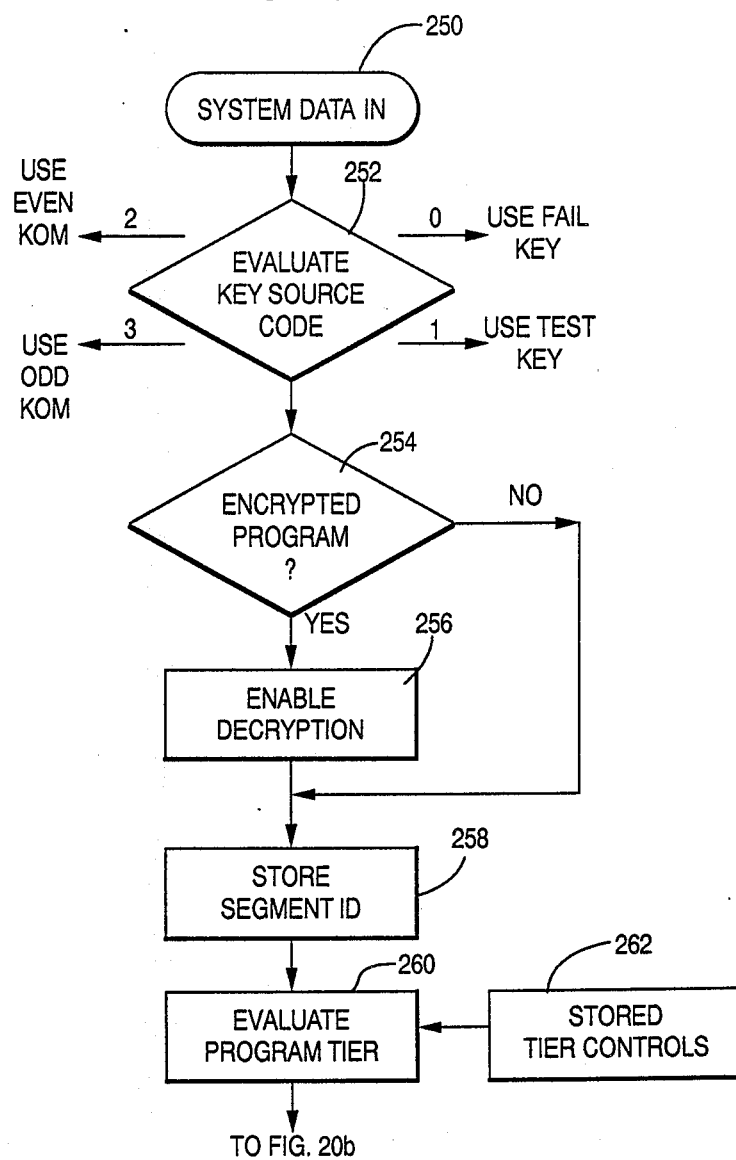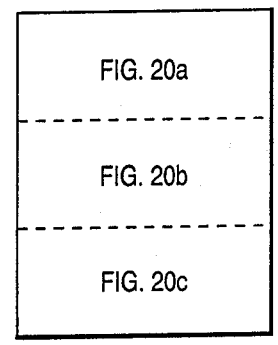

TO FIG. 20c

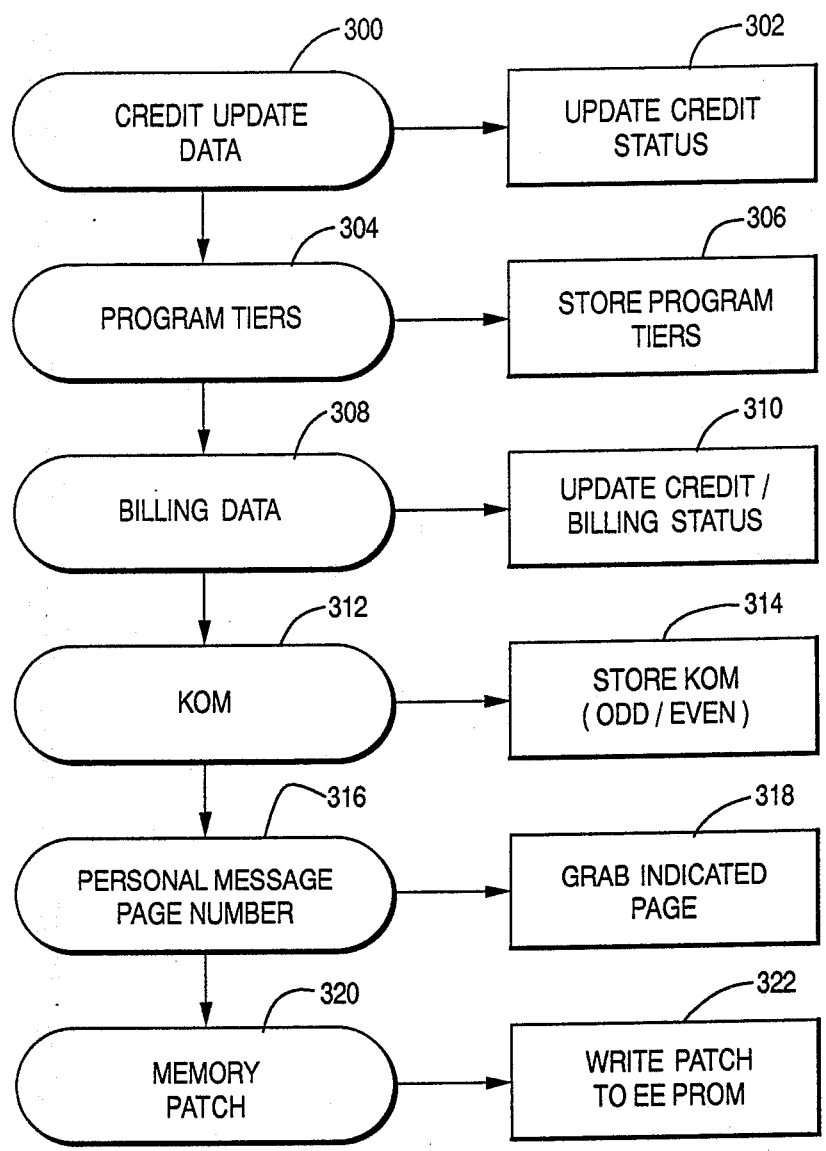

COMMUNICATIONS FORMAT FOR A SUBSCRIPTION TELEVISION SYSTEM PERMITTING TRANSMISSION OF INDIVIDUAL TEXT MESSAGES TO SUBSCRIBERS

This application is a continuation of application Ser. No. 833,310, filed July 8, 1986, now abandoned.

FIELD OF THE INVENTION

This application relates to improvements in subscription television systems. More particularly, the invention relates to a communications system and format for a subscription television system which permits communication of individually addressable text messages from a central location to individual subscribers.

BACKGROUND OF THE INVENTION

The sophistication of communications systems involving subscription television is continually increasing. The systems being installed at this time have greatly improved communications flexibility as compared to those previously in use, while the quality of the transmitted signal is continually being improved, as is flexibility in the business arrangements possible between the subscriber and the broadcaster. For example, in U.S. Pat. No. 4,484,217 to Block et al., there is disclosed a subscription television system in which all billing calculations are carried out at the decoder, that is, at the individual subscriber's location. When a subscriber makes a payment, e.g., by simply mailing a check to the broadcaster, the broadcaster then sends a message which is detected by that particular decoder and used by it to update the user's credit and/or account balance information. The decoder then controls whether the user is to have access to a particular program or not in accordance with this billing information, possibly also in accordance with other sorts of access controls transmitted by the broadcaster. For example, each program transmitted may include an indication that it belongs to a particular "tier" or class of programs. The decoder then permits access to the program if programs of that tier had previously been authorized.

The Block et al. patent also discloses that teletext data, that is, textual information relating to stock market reports and the like, could also be transmitted using this system. However, the teletext data discussed in the Block et al. patent appears to be system-wide data, that is, data relevant to all subscribers of the system more or less equally. The Block et al. patent does not teach any way in which, for example, an individual broadcaster may send a chosen subscriber a personal message other than billing update data, as above.

"Specification of Standards for Broadcast Teletext Signals", a document published by the British Broadcasting Corporation et al. in September, 1976, describes the teletext broadcasting system in effect in the United Kingdom. According to this system, teletext information such as closed-captioned programming is available for the hearing impaired. According to this system, as understood by the applicants, the subscriber simply depresses a button on a key pad comprised by the decoder, and the decoder then selects alphanumeric data which is transmitted during the vertical blanking interval of the standard television signal. The decoder can then add this closed-captioned textual material directly to the video screen, so that it can be seen by the hearing impaired. Again, however, this material is transmitted system-wide, and there is no provision made for transmission of individual messages to individual subscribers.

Those skilled in the art will recognize that there are a number of constraints on the operation of any successful subscription television system. For example, there must be an extremely reliable and trustworthy method of computing charges to be billed to the subscriber and for communication of credit status updates. It is also desirable that the subscriber be permitted to prepay for certain classes of service, for example, to have access to a particular broadcaster's offerings. On the other hand, it is also desirable that an "impulse" purchase system be provided such that the viewer could purchase a particular program on a "pay-per-view" basis when desired. Similarly, it is desired that a running list of programs purchased by the subscriber be available, such that he can confirm that he is indeed being billed correctly. It is furthermore desired that means be provided for securing the system against improper use, which includes both prevention of viewing of inappropriate subject matter and purchase of fee-bearing material by persons not authorized to do so.

The requirement that the credit status be updateable further requires that communication be possible in both directions between the decoder and the transmitter. However, it would be inefficient to provide individual uplink transmission facilities at each decoder in a satellite transmission system, for example. Therefore, it is desirable that a two-way communications facility be provided connecting each decoder with the transmitter, but in which the two data links are not made using the same medium. Therefore, the communication facility which carries subscription television signals from the transmitter to the decoder is not the same as that used to carry payment status information, queries or the like from the decoder to the transmitter.

As indicated above, the prior art suggests that individual decoders can be addressed for transmission of billing information. It would also be desirable if individual user messages could be transmitted to individual users such as to provide an additional communications facility not previously made available. If this is to be done, there are several criteria which must be met. Paramount among these is security; preservation of the secrecy of the message and its availability only to the particular addressee is of utmost importance. At the same time, it is desired to be able to address messages to classes of subscribers to transmit important civic data, emergency messages, or the like.

Another complexity in providing a secure subscription television system is the fact that the decoder cannot be considered to be in "friendly hands". That is, unlike an encrypted data channel as used by financial institutions or in military applications, in which both transmitter and receiver are in friendly hands, an additional security exposure which must be faced in connection with a television system is analysis of the transmitted signal. In a subscription television system, the transmitted signal must, of course, be protected, as a very important threat is posed by viewers who have purchased a decoder and attempted to modify it to bypass the security mechanisms, the billing arrangements or the like. A further problem is posed by those who would make copies of, for example, television movies using videotape recorders or the like for subsequent viewing or resale.

It is, therefore, desirable that a system be provided which provides a very high level of security, both as to the transmitted signal and as to the operation of the decoder, and one in which some sort of "fingerprint" identifying the source of an unauthorized copy can be made.

It is therefore a broad object of the invention to provide a communications format and capability for a subscription television system such that individual text messages may be directed to individual subscribers.

It is a further object of the invention to provide a communication format for a subscription television system in which individual text messages can be transmitted to individual subscribers, in which the message can only be received by the proper receiver and in which the text is very heavily protected against improper receipt, that is, encrypted, such that it can only be received and decrypted at the correct decoder, thus providing an additional level of security to the message handling system.

It is a further object of the invention to provide a communication format for subscription television systems such that an individual message can be sent to individual users, but in which the individual decoder is enabled to receive and decrypt the specified message only upon activation by the proper individual.

A further object of the invention is to provide a communications format for a subscription television system in which individual text messages can be received by individual subscribers in response to queries by the subscriber, in response to the desire of the broadcaster, or upon initiation by the decoder itself.

SUMMARY OF THE INVENTION

The above needs of the art and objects of the invention are met by the present invention, which comprises a communication format, system and method for a subscription television system. According to the invention, a number of distinct "lines" of information are transmitted during each vertical blanking interval of the video signal. One line of the information includes "system data" relevant to operations of the entire system. Another group of the lines are referred to as "addressed packets", which are directed to individual subscribers, while another group of lines includes teletext information. The addressed packets include identification of individual subscribers which are transmitted in clear text (that is, are not encrypted) such that the individual decoders recognize their own numbers. The addressed packets include certain cipher information, used in decrypting other portions of the information contained in the blanking interval and in the video signal. The addressed packet also indicates that a particular "page" of teletext information is being transmitted which is directed to a particular subscriber. The decoder, having detected the existence of a message addressed to it responsive to the information contained in the addressed packet, then selects subsequently transmitted teletext "lines" included in subsequent vertical blanking intervals, and uses these to assemble a teletext "picture" which can then be displayed on the user's television screen.

In a preferred embodiment, the broadcaster continually sends teletext information which is useful in subsequently assembling messages. The teletext information repetitively transmitted includes "templates". For example, should the subscriber seek to ascertain his billing status, he will so indicate by pressing a button or buttons on a user key pad comprised by his decoder. A microprocessor comprised in the decoder will note this request and will access its own internal memory to determine the number of a template suitable for displaying this information. When that page of text is subsequently transmitted, as part of the regular sequence of teletext messages, the microprocessor selects it, and then completes the template by filling in various dollar amounts and the like unique to the particular subscriber. This completes assembly of the billing report requested. The microprocessor then can display the complete billing report. In this way, the teletext information comprised in the template, that is, the information needed for the text message which is not user specific, such as column headings, current dates, and the broadcaster's name and address, which are common to all subscribers, need not be stored at the user location. This greatly reduces the amount of memory which must be provided for each decoder. In the same way, the templates can be varied by the broadcaster, e.g., to update the listing of the services available or the like.

The decoder itself can also generate various reports, for example, to indicate to the subscriber that his credit is running low. The microprocessor can select a template page from the sequence of template pages continually being sent by the broadcaster and can complete it with user-specific billing information, all as generally discussed above.

In this way, it will be observed that there are three different ways of providing a teletext message, that is, user-initiated, broadcaster-initiated, and decoder-initiated.

The system data transmitted according to the invention includes data which is relevant in the operation of the entire system. For example, the system data will include an identification of the program currently being transmitted. This identification can be a number keyed to a catalog, for example, such that if the number is stored at the decoder, the user can later employ it to determine whether he is being correctly charged for a particular program. The program identifier may also include a program tier number indicating that a particular program belongs to a tier of programs. The program tier number is used by the decoder to determine whether the user is entitled to have access to the particular program. Examples of program tiers include special sports events, X-rated movies, various pay TV channels and the like. The system data also includes a decryption key which is used by the decoder to decrypt encoded video, audio and teletext material.

In the preferred embodiment, the system data is extensively protected by means of additional error correction characters and by duplication, such that it is very reliably received. Due to this duplication, more system data is required for operation of the system than can be transmitted in a single line in a single field. Therefore, the system data is transmitted over a number of fields; in a preferred embodiment, this number is three. The system data transmitted in a given field is also duplicated a predetermined number of times, five in a preferred embodiment, such that majority logic can readily be used to ensure correct receipt of the system data.

The system data includes in addition to the data described above an encryption key which is used in the decoder to decrypt portions of the video, audio and teletext information. By virtue of the very high degree of security provided by the duplicative transmission and error correction facility, system data is received with high reliability. The key is changed at the completion of each "cryptocycle", that is, upon complete transmission of the system data, to further protect against its illegal duplication.

BRIEF DESCRIPTION OF THE DRAWINGS

The invention will be better understood if reference is made to the accompanying drawings, in which:

FIG. 10 shows in detail the data carried in the first packet, packet A, of the system data;

FIG. 11 shows in detail the data carried during the second packet, packet B, of the system data;

FIG. 14 shows the outline of a teletext header line which can be transmitted in any one of lines 9–13 of the vertical blanking interval;

FIG. 15 shows a text line, that is a line of teletext which may be transmitted during any one of lines 9–13 of the vertical blanking interval;

FIG. 20, comprising FIGS. 20a–20c, shows in schematic form a flow chart of the processing of the system control data transmitted by the broadcaster for control of each of the decoders of the system;

FIG. 21 shows in schematic form the use of the information transmitted to the decoders by way of the addressed packet.

DESCRIPTION OF THE PREFERRED EMBODIMENTS

As mentioned above, it is an important object of the present invention to provide a communications format for a subscription television system which has the capability of transmitting individual text messages. This is to be accomplished without adding unduly to the complexity of the system or its cost, and without requiring any sort of uplink communication between the decoder and the transmitter. Moreover, the system is to be provided with unprecedented flexibility in choice of program by both the broadcaster and the user, and the subscriber billing is to be substantially automated and performed at the decoder. Finally, the whole system is to be menu-driven, that is, the subscriber is to be directed in operation of the system by messages displayed on his television screen.

These objects of the invention are achieved by the present system, which is described in the following text, of which the following is a Table of Contents, and in which reference is made to the accompanying drawings.

A. System Overview

Figure 1:
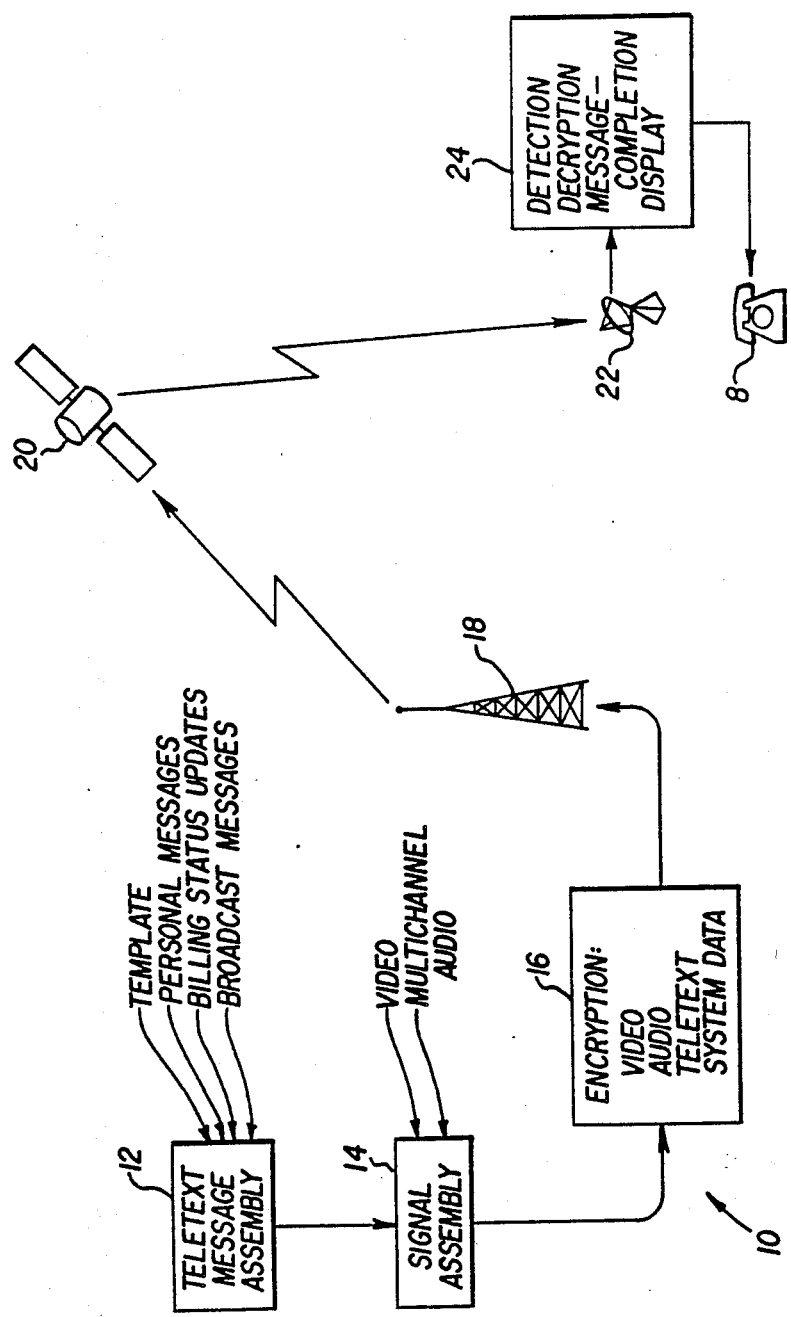
FIG. 1 shows an overall view of a communication system according to the invention.

FIG. 1 shows in highly schematic form a communication system suitable for achieving the objects of the invention listed above. At a first transmitter location, indicated generally by the numeral 10, the teletext message sequence is first assembled as indicated at 12. This may include standard items such as templates, that is, data which provides a format within which user-specific information can be added by a decoder to personalize a message; personal messages directed to individual users; billing status updates, that is, billing information generated in response to a telephone call or letter from the subscriber to the broadcaster; and broadcast messages, that is, messages which are out of the ordinary course of business, but which are transmitted to substantially all or a predetermined subcategory of subscribers (for example, that there is some general danger of which all should be aware).

At 14, the teletext information from item 12 is assembled together with video information, and in a preferred embodiment of the system of the invention, with multi-channel audio. As will be detailed below in connection with FIGS. 3 and 4, six channels of digital audio are provided in the system of the invention. These are transmitted during the horizontal blanking interval and may be provided on a pay-per-listen basis, whereby the broadcaster can generate additional revenue from audio transmission.

At 16, the assembled teletext, video and audio signal is encrypted. The signal transmitted includes what are referred to as addressed packets, which among other functions alert an individual subscriber's decoder that a message has been sent to it, and teletext information. The subscriber identification portion of the addressed packet is transmitted in clear text, that is, is not encrypted, so that it can be detected without decryption. The addressed packet further contains certain cipher key information used in decrypting system control data. In turn the system control data is required for decryption of encrypted user messages. Thus, a double level of security is provided, as only the individual decoder can even receive the message, and only that decoder can use the system data which it also must receive to decode the individual message, which is subsequently sent. The composite, encrypted signal is transmitted as indicated at 18. It may travel via a satellite 20, by a landline or a combination of both to receiving antenna 22. It is there passed to a decoder 24 which comprises means for detecting the signal, decrypting the encrypted portions of it, completing any messages requiring any subscriber-specific data, such as billing status information and the like, and display of the received messages. Of course, the decoder also permits user selection of the decrypted audio and video information, and includes means for maintaining the billing history information related to a specific user, for restricting access of individuals to the video signal, prevention of impulse purchase of programs by those not authorized to do so, and so on, all as detailed below.

The system of the invention is completed by means permitting the user to communicate with the broadcaster. Ordinarily, the user will only need to communicate with the broadcaster sporadically, for example, to request addition of a service, or to pay a bill or the like. Conventional communications facilities such as the telephone system or the mails are suited for this function, as indicated schematically at 8. In this way, no uplink facility at the user's station need be provided.

B. The Communications Format Employed

1. Overview

Figure 2:
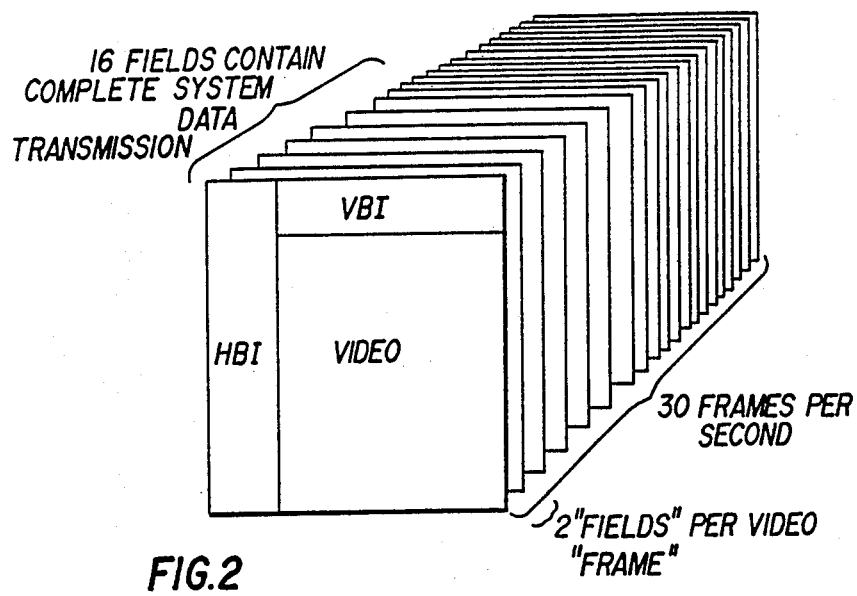
FIG. 2 shows an overall view of the signal format according to the invention, and explains certain nomenclature used for understanding the system of the invention.

FIG. 2 shows the overall transmission format of the system according to the invention. As is conventional in television, 30 "frames" each comprising a still image are transmitted per second as indicated. Each frame includes two "fields" as also shown. In a preferred embodiment of the invention, the video encoding scheme employed is that referred to generally as "B-MAC". This is an acronym for type B format, Multiplexed Analog Component system. "Type B" refers to the fact that data is carried integral to the video signal. See generally Lowry, "B-MAC: An Optimum Format for Satellite Television Transmission", *SMPTE Journal,* November 1984, pp. 1034–1043, which discusses in detail the B-MAC format and explains why it was chosen over various competing systems.

According to the present invention, the vertical blanking interval (VBI) of each field contains certain "system data" necessary for operation of a subscription television system according to the invention, as well as addressed packets and teletext lines used to carry data needed for the operation of individual decoders and for transmission of messages to individual subscribers. In the preferred embodiment of the present invention, the vertical blanking intervals of 16 total fields are used for complete transmission of all system data required, which includes an encryption key which is changed every 16 fields, that is, on the order of three times per second. As also shown in FIG. 2, each line also includes a horizontal blanking interval (HBI). During the HBI are transmitted six channels of high quality digitally-encoded audio information, with error correction, such that the decoder can also be used to supply a high quality audio signal. This can be used to provide the audio component of the corresponding video signal (or several versions thereof, in different languages) or an additional audio signal, such that subscription audio is also made available according to the system of the invention.

2. The Horizontal Blanking Interval

Figure 3:
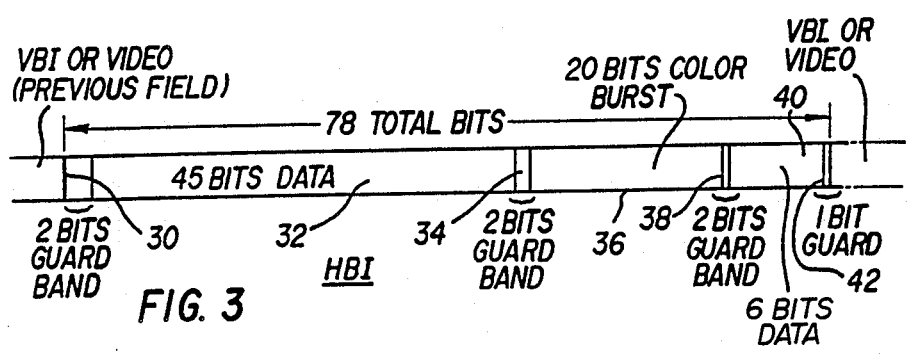
FIG. 3 shows in broad outline the format of the horizontal blanking interval.

FIG. 3 shows the format of the horizontal blanking interval (HBI), which begins each line of each field. In the preferred embodiment, the HBI consists of 78 total bits of four-level frequency-shift-keyed (FSK) data. The HBI is interposed between the vertical blanking interval or video information from a previous line and that of the present line. A typical horizontal blanking interval as shown begins with a two-bit guard band 30, followed by 45 bits of audio and utility data 32, a second two-bit guard band 34, twenty bits of color burst information 36, a further guard band 38, six more bits of data 40 and a final guard band 42, after which the VBI or the video signal of the particular line commences. The position of the color burst 36 within the HBI varies, to provide signal scrambling; descrambling involves the use of a repetitively-transmitted key, described below in connection with FIGS. 10–12. The number of bits of data in the HBI of each line can be varied pseudorandomly as well; the average number is 51.

Figure 4:
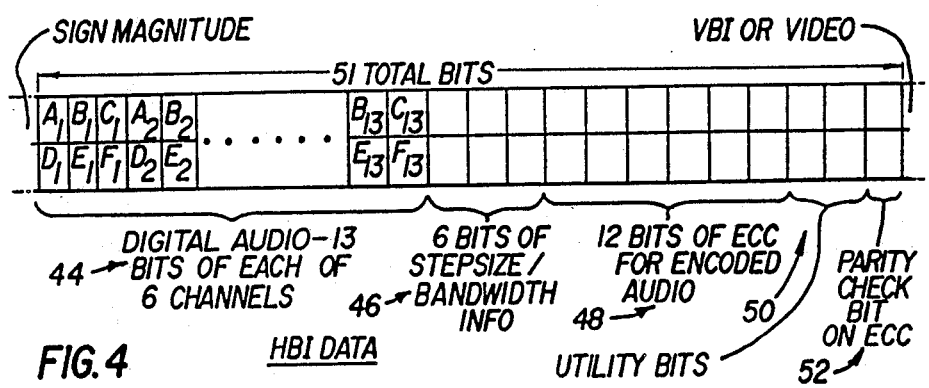
FIG. 4 shows additional details of the format of the horizontal blanking interval.

FIG. 4 shows some additional details of the horizontal blanking interval data 32 and 40 shown in FIG. 3. In the example shown, fifty-one total bits of data are provided in each line of the HBI, and each bit is four-level FSK encoded, such that each bit period includes transmission of two bits. One bit can be referred to as sign and the other as magnitude as indicated on FIG. 4. As shown, the first seventy-eight bits are digital audio; thus each frame provides a thirteen-bit digital representation of a sample of each of six audio channels. High quality transmission of audio frequencies up to approximately 15 kHz is thus provided. Following the audio information are six bits of stepsize and bandwidth information. The stepsize bits indicate the size of the steps numbered by the thirteen bits of information preceding, and the bandwidth information relates to the amount of emphasis or de-emphasis of the signal employed. Alternate fields carry the stepsize and bandwidth data. Both these terms are used as conventional in the "Dolby delta modulation" scheme, which is employed in the preferred embodiment of this invention for transmission of the audio. Following are twelve bits of error correction code (ECC) for correction of the audio, indicated at 48. Four utility bits follow at 50, and the last bits 52 of the data are parity check bits for checking the parity of the error correction bits 48.

3. The Vertical Blanking Interval

Figure 5:
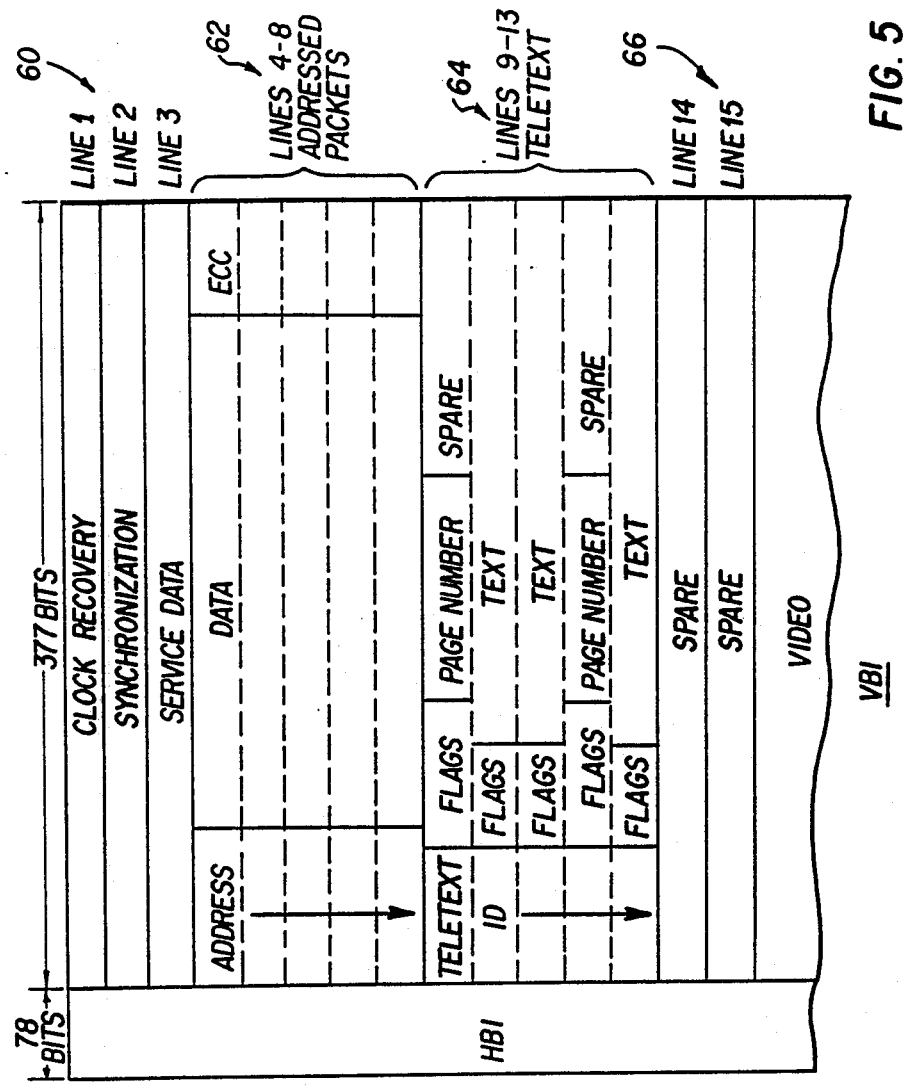
FIG. 5 shows an overview of the material carried in the 16 lines of the vertical blanking interval in a 525 line embodiment of the invention.

FIG. 5 shows the arrangement of the lines which make up the vertical blanking interval (VBI). The VBI includes 16 lines in the 525-line NTSC version of this invention. A slightly different number of lines are used in the 625-line PAL embodiment of this invention. The functions of the lines and their arrangement in other respects are identical. Discussion of a specific number of lines herein therefore should not be taken to limit the invention, except as specifically required.

As indicated, the vertical blanking interval is 377 bits wide. These bits are two level FSK encoded as compared to the four level FSK scheme used in the HBI as discussed above. Lines 1, 2 and 3 include the transmission of clock recovery, synchronization and system service data, as indicated in FIG. 5. The detailed formats of lines 1 and 2 and the use of the information contained therein are discussed in co-pending application Ser. No. 704,024, filed Feb. 21, 1985, incorporated by reference herein.

A particularly significant portion of the data contained in lines 1-3 is a system key which is updated every sixteen frames, that is, which changes with each complete system data transmission as indicated above in connection with FIG. 2. The system key is common to all decoders. The system key is contained in the service data of line 3, and is used for decryption of video program material, audio and teletext together with additional less frequently transmitted, but individually varied cipher data, as well as invariant individual decryption ciphers. This arrangement provides substantial system security. Operation of this system is described in detail below.

Lines 4-8 of the VBI include the addressed packets, as indicated by reference numeral 62. As noted, these each contain an address which is then followed by data, concluding with error correction coding (ECC). The addresses are those of the individual decoders. The addresses in the address packets are transmitted in clear text, such that they can be received without decryption by the receiver. The remainder of the message is encrypted. In this way, addressed packet data, which is very significant to the proper functioning of the system because one of the addressed packets includes one of the decrypting ciphers needed, is provided with a high degree of security. Addressed packets addressed to differing decoders can be transmitted in the same field.

As indicated at 64, lines 9-13 of the VBI are used to transmit teletext. The first part of each teletext line is a teletext identification which indicates that the line in fact is teletext. As shown, two types of teletext lines are used. Teletext headers include a relatively larger number of flags, and indicate which of the following teletext lines are part of a particular "page" or message. The text lines themselves include a somewhat lesser number of flags and text data; typically forty ASCII-encoded bytes are sent per text line, and up to twenty lines can be displayed on the user's screen at once. Finally, lines 14 and 15 indicated at 66 are not used in the presently preferred embodiment of the invention.

4. Line 1

Figure 6:
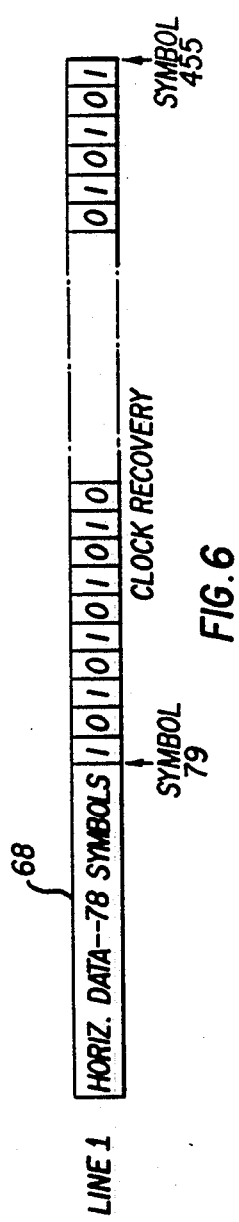
FIG. 6 shows in some additional detail the clock recovery data carried in line 1 of the vertical blanking interval.

FIG. 6 shows line 1 of the VBI which consists of alternative zeroes and ones, or maxima and minima of the transmitted symbol set, if multi-level symbols are used. At the typical NTSC transmission frequency, these symbols occur at a rate of 7.16 mHz, twice the color subcarrier frequency. Line 1 therefore contains a 52.66 microsecond continuous wave of 3.58 mHz, the subcarrier frequency. Preferably, the receiver will typically contain a clock driven at the color subcarrier frequency. (When the term "receiver" is used herein, it will usually include not only the standard television receiver, but also the decoder and other terminal equipment necessary to convert the incoming television signal to a standard format. The clock therefore may be considered part of the decoder portion of the receiving system). Line 1 is thus used to drive the receiver's phase locked loop circuit into synchronism with the transmitter clock.

5. Line 2

Figure 7:
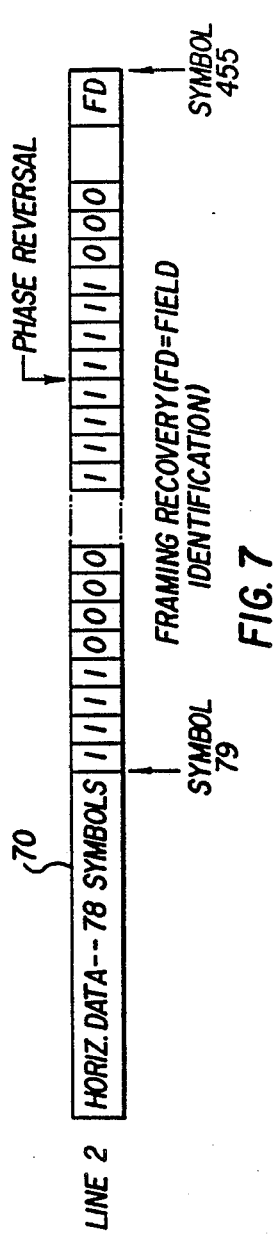
FIG. 7 shows in additional detail the framing recovery data carried in line 2 of the vertical blanking interval.

Line 2 of the VBI is shown in FIG. 7, which consists of a timing signal used for framing recovery. This subject is discussed in more detail in application Ser. No. 736,305, filed May 21, 1985, which is incorporated herein by reference. Beginning at symbol 79, a series of first code patterns P is transmitted. The first code pattern P is the following set of eight binary digits: 1 1 1 1 0 0 0 0. This first code pattern P is transmitted 41½ times for a total of 332 symbols. After the first code pattern P has been transmitted, a second code pattern which is the inverse of P, that is, 0 0 0 0 1 1 1 1, is transmitted twice, in phase with P. Since the P pattern is transmitted 41½ times, it ends 1 1 1 1; and since the Q pattern is transmitted in phase, it begins 1 1 1 1. Hence the phase reversal occurs in the middle of a set of eight ones in a row. Finally, a field identification FD is transmitted which can be used to identify which one of the 16 fields transmitted in a cryptocycle is being transmitted in the particular field.

6. Line 3 a. The Cryptocycle

Figure 8:
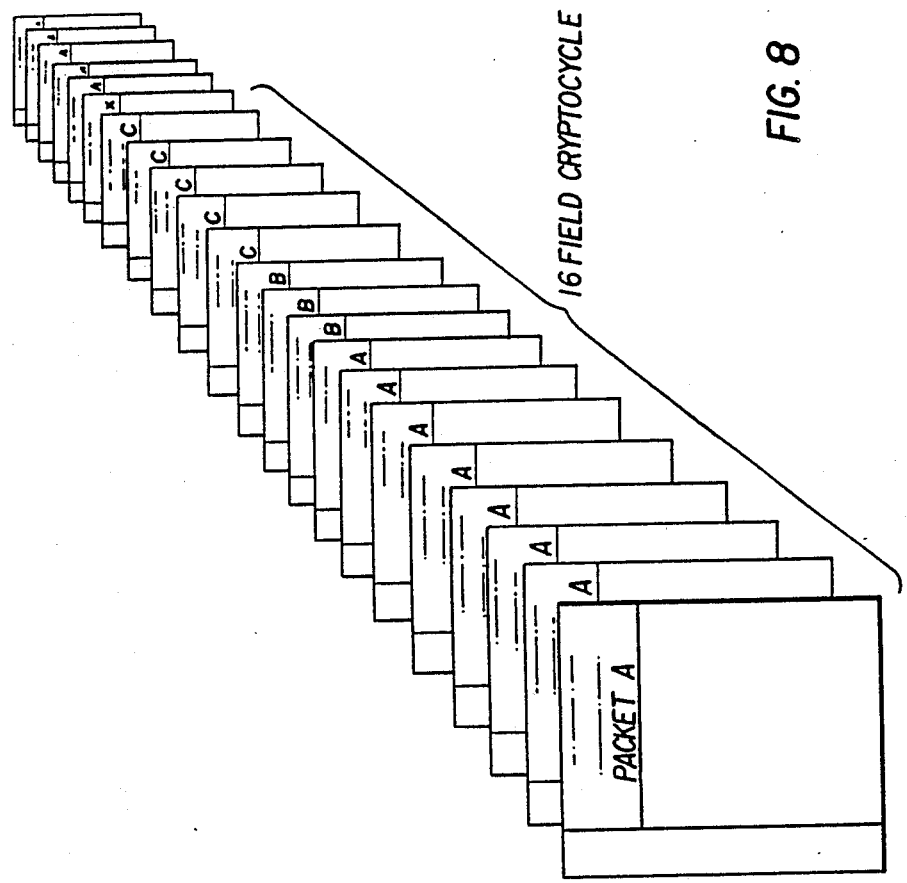
FIG. 8 shows in schematic form the sequence of transmission of the three packets of data making up the system data.

FIG. 8 shows the 16-field cryptocycle. According to this aspect of the invention, the system data transmitted in line 3 of the VBI is too extensive to fit into a single line, given the extensive data duplication and error correction coding provided, which is discussed in detail below. Therefore, the system data is divided into three packets which are transmitted as part of different fields. Furthermore, each of the three packets is repeated five times in successive fields, for further error elimination through the use of majority logic. Thus in FIG. 8, a first packet A is shown being transmitted in the first five fields of the 16 field cryptocycle, packet B is transmitted in the next five, and packet C in the succeeding five. The sixteenth field is marked with an "X" in the location of line 3; this is done to indicate that system data is not derived from the sixteenth field of the cryptocycle.

b. Line 3 Format

Figure 9:
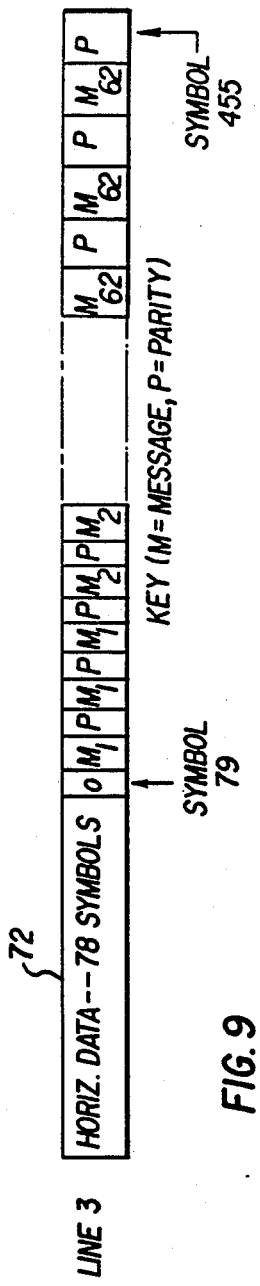
FIG. 9 shows schematically the arrangement of line 3 of the vertical blanking interval, during which the system data is transmitted.

As mentioned above, three packets of data are transmitted in line 3. Each of these contains data which is relevant to the operation of the entire system. It is accordingly extremely important that each be accurately received. To ensure this, each packet is transmitted three times, as described above in connection with FIG. 8. Furthermore, each bit of each packet is repeated three times within the line and each individual bit is protected by a parity bit. Thus, in FIG. 9, one can observe that the first bit, bit $M_1$, is repeated three times and each repetition thereof is followed by a parity bit P. Bit $M_2$ is then transmitted identically and so on, until the last bit $M_{62}$ is reached. There are some additional bits which are transmitted, but which are not used; these are omitted from FIG. 9 for clarity.

As described in detail below, the decoder comprises a microprocessor and a microprocessor and teletext support (MATS) chip. The MATS chip provides a number of message processing steps which must be performed at high speed, higher than the capability of the microprocessor. As described below, the MATS chip and the microprocessor together reduce the 30 bits transmitted for each bit of the system control data to one. In particular, the MATS chip reduces the redundant data of each line to one, and the microprocessor performs 5:1 majority logic voting between the multiply-transmitted lines. This has important advantages as detailed below.

c. The Distinction between System-Wide and Individual-Decoder Data

It will be appreciated by those skilled in the art that the communications system of the invention requires certain data to be transmitted system-wide, that is, all the decoders must receive certain information, while other information should be transmitted only to individually addressable decoders. Furthermore, it will be appreciated that some data, such as data identifying the program material currently being transmitted or constantly changing ciphers, needs to be transmitted repetitively, over and over again, while other data need only be transmitted infrequently or upon a single occurrence.

According to one important aspect of the present invention, data which must be transmitted system-wide and/or repetitively is transmitted as part of the system data in line 3, whereas control data (as opposed to teletext) transmitted to individual decoders or groups of decoders is transmitted as part of the addressed packets appearing in lines 4–8. As mentioned above, three different versions of line 3, which together include all system data, are transmitted during the "cryptocycle" which is completed every sixteen frames, i.e., approximately every one-third second. For example, the system data may include a "fingerprint" bit. When detected, this bit causes the user identification number to be copied to the display for a single frame, such that any reproduction made of the program being transmitted at that time will include the user identification number. This enables tracking down of the source of illegal copies. Other system data includes a service key required for decrypting the video signal; this service key is changed every sixteen fields which makes it difficult to obtain illegally.

Other information repetitively transmitted as part of the system data includes the program tier number, that is, an indication of the tier to which the program being transmitted on a particular channel at that time belongs. The tier concept is used to separate various classes of programming transmitted by the transmitter. The user selects which tiers of programs he chooses to watch, e.g., sports programs, special features, premium movies, and the like. The user then indicates which tiers he wishes to view to the broadcaster, e.g., by telephone or by letter, and the broadcaster transmits indication of the tiers selected by the user to the user's decoder individually as part of an addressed packet. The individual decoders then use the tier number transmitted as part of the system data to either enable or disable the viewing of a particular program at a particular time. The distinction between system data and addressed packet data is thus illustrated: The program tier number relates to the particular program being transmitted by the broadcaster at a given time and thus clearly should be transmitted to all decoders. On the other hand, the primary and secondary program tiers, which terms refer to the tiers selected by and paid for by the subscriber, are transmitted individually as part of the addressed packets, thus enabling the decoder to determine which programs it should allow the viewer to see.

d. The System Data Packets

Figure 12:
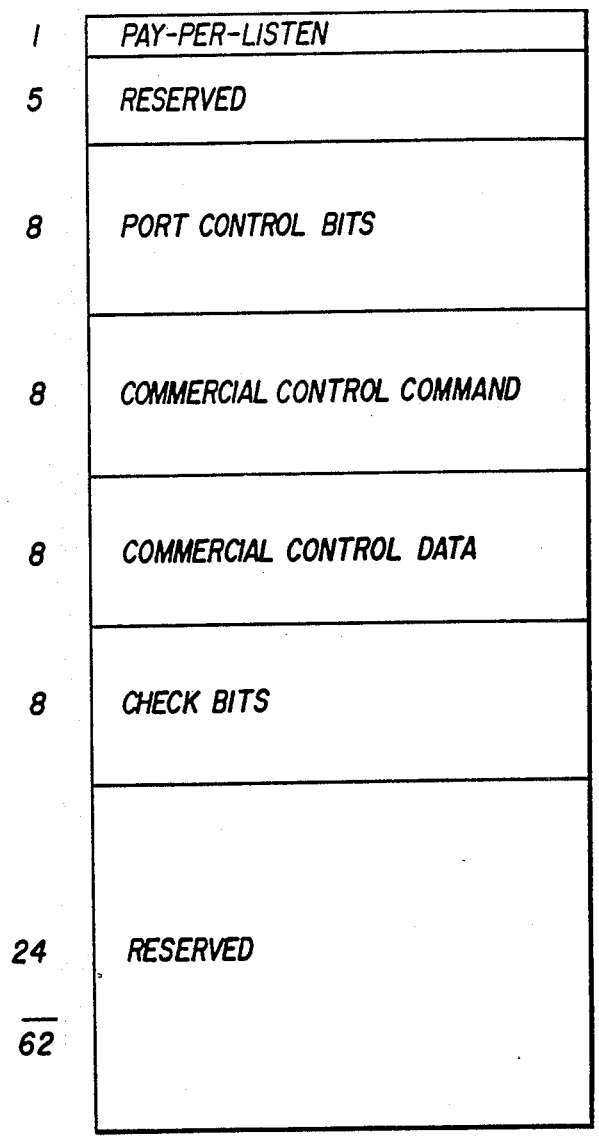
FIG. 12 shows in detail the data carried in the third packet, packet C, of the system data.

FIGS. 10, 11 and 12 show, respectively, packets A, B and C of the system data, that is, the three portions into which the system data is divided for transmission on line 3 of different fields. In each case, the Figure shows in a column extending down the left side the number of bits each data item requires, next to the title of the data item. A brief text description of each item follows.

(i) Packet A

Thus, in FIG. 10, the first data item shown is a one-bit entry for "full field mode select". This bit is provided in order to allow teletext or addressed packets to be transmitted on what would otherwise be lines of the video signal. This capability is not provided in the presently preferred embodiment of the invention.

The next item is a two-bit entry for the key source code. These two bits enable broadcaster control of decryption of the signal, including the video signal, for a variety of purposes such as testing. For example, if this field is zero, that is, 00, decryption of the system data is done using a "fail" key which is stored as part of the microprocessor, and which is the same with respect to all the decoders in a given system. This allows all services to be decoded. The signal will of course have been encrypted using the corresponding key. In this way the usual steps required to transmit a key to the decoder for decryption can be bypassed for testing and similar purposes. When this field is 1, that is, 01, decryption is done using a second stored key referred to as the "test" key, in a similar manner and for similar reasons. When this field is 2, that is, 02, decryption of the system data is done using the even key of the month (KOM); when it is 3, that is, 11, decryption is done using the odd key of the month. The key of the month is a decryption key which is transmitted to each individual decoder by way of the addressed packet, as more fully explained below. Because the key of the month is transmitted separately to each individual decoder, typically the key of the month for a succeeding month is transmitted prior to the preceding month's end, so as to ensure that each decoder receives its key in plenty of time, so that the user is not prevented from seeing programs when the month ends and the encryption key used at the transmitter changes. The even or odd key of the month simply refers to which of the two stored keys of the month are to be used by the decoder in decrypting the signal.

The next item in packet A is a one-bit entry indicating an encrypted program. When this field is 0, the system data is non-encrypted; when it is 1, it is encrypted and therefore must be decrypted before use.

The following segment, "broadcaster identification" is a two-bit entry allowing one of up to four different broadcasters to be specified; this information is used in decoding the remainder of the system data. In particular, each of the four broadcasters may have two KOMs, differing tier identifications, and differing billing arrangements. The broadcaster identification bits allow all system data to be separately tracked for each. Throughout the following discussion this fact should be kept in mind, although usually only two KOMs are referred to, for example, for simplicity.

The next item, the program tier number, is an eight-bit entry. This in combination with the four-bit service tier number which follows specifies the class of program to which the currently transmitted program belongs. This information is used by the decoder for comparison to authorized program tiers, that is, program tiers selected and paid for by the user, to determine whether a particular user is permitted to view the particular program being transmitted, as discussed above.

The program number segment of the packet A is a 12-bit item which together with the segment identification forms a program identification. Should a user purchase a program through a pay-per-view arrangement, that is, as opposed to viewing it through its being a member of a tier to which he is authorized access, the program identification is saved in the memory of the microprocessor comprised by the decoder. This is used in order to track pay-per-view billing for the user's convenience.

The cost of current program item is an eight-bit field used to price the current program for pay-per-view billing purposes.

The following item is the first section of the decryption key and is 14 bits long. This with the nine-bit second segment and the 32-bit third segment appearing in packet B (FIG. 11) together make up a 55-bit decryption key which is unique to each cryptocycle. That is to say, this portion of the decryption key information is varied at the end of each cryptocycle, that is, approximately every one-third second, which has the effect of rendering the unauthorized theft of any one of these decryption keys relatively worthless to the thief. The key may be used in decryption as generally discussed below and also to indicate the position of the color burst in the HBI, as discussed above. Different portions of the key may be used in decryption of different parts of the signal; that is, there may be separate audio seeds, video seeds, teletext seed, and so forth.

The remaining bit in packet A of FIG. 10 is a fast scrambling select bit which allows the selection between several descrambling algorithms to be used by video descrambling hardware comprised by the decoder. See generally copending application U.S. Pat. No. 4,642,688 to Lowrey et al issued Feb. 10, 1987, incorporated by reference herein.

(ii) Packet B

FIG. 11 shows packet B of the system data. In addition to the last segment of the decryption key which was discussed above, this packet includes an eight-bit item entitled "black-out code". This is used for geographical black-out purposes, for example, to prevent reception of sporting events in the viewing area of the venue, which is frequently required in the business arrangements between the sanctioning body and the broadcaster. The decoder is supplied with an eight-bit number which is compared with the black-out code to prevent the viewer from viewing the program where indicated.

Following the black-out code is a single bit which is the most significant bit of the program cost which is used in conjunction with the cost of current program item appearing in packet A (FIG. 10).

Five check bits are also provided as indicated on FIG. 11. This field includes the last five bits of the system data, which are written thereto before encryption. This enables comparison of these five bits with the last five bits of the system data after decryption. This allows the decoder to detect bit errors in the system data and in turn to prevent operation using an improper KOM, by preventing the decoder from responding to system data. This is thus ultimately one point at which the KOM is used to ensure security of the program material.

A single bit is used as a fingerprint trigger. This bit when set causes the user identification number to be written to the user's screen at a particular point in the transmission of a particular program, such as a pay TV movie. If the user then makes an illegal copy of the program, using a VCR or the like, the user identification number will be written to he copy at a specific point known to the broadcaster. Should the user make illegal copies and distribute them, this will enable the broadcaster to locate the original source of the illegal copy and take appropriate action.

The next bit is an impulse enable bit which prevents the general public from buying the program through the buy button, but restricts purchases to the program tier method described above.

The following item includes five bits of audio/data channel usage information. This associates the six channels of audio with the program. For example, in many countries, several languages are spoken, or the same language is spoken in a number of different dialects, each of which may be separately transmitted by the broadcaster in association with the video portion of the program. In a preferred embodiment, $32(2^5)$ combinations of the following information categories can be provided in the six audio channels of the HBI: TV audio, monaural audio, pay audio, stereo audio, and data. The audio/data channel usage information thus provides the correlation needed by the decoder to satisfy the user's selection from among the HBI channels.

The three-bit program rating item provides an indication of the maturity level of the current program, for example, for use by parents in preventing access of children to inappropriate program material.

The next item, active video usage, allows indication of the program transmission format, i.e. whether it is B-MAC, NTSC or otherwise.

The general message bit is used to indicate to the decoder that a general message, that is, a teletext message directed to all of the subscribers, for example, to indicate that a programming change has been made or the like, is available.

The source switch request item is a single bit used to automatically switch the decoder to a new transmitter, for use where plural transmitters are used to transmit the same program material, as may be useful, for example, in large countries where long distance transmissions may be difficult.

The next bit, scrambled program, indicates whether the video is scrambled or not, thus indicating to the decoder whether descrambling is necessary.

Finally, the tracked program item is a single bit which, if the program is purchased using a pay-per-view arrangement, causes the program identification to be saved by the microprocessor.

(iii) Packet C

FIG. 12 shows Packet C of the system data. The first bit, Pay-per-Listen, indicates that a predetermined set of the audio channels are carrying subscription programs, that is, ones for which the user must pay if he wishes to hear the material. In such case, the program tier number, program number, cost of current program and track program fields pertain to the current program on the designated audio channels, rather than the current video program.

The next five bits are reserved, that is, are not used in the preferred embodiment of the invention.

The next four fields, each of which is eight bits long, provide additional system control bits. The port control bits are presented by the MATS directly to the microprocessor for use. For example, these may allow remote control of VCR operations at the decoder useful as discussed below. The commercial control command and commercial control data bits are used in certain commercial embodiments of the decoder, discussed below. The check bits are used for error detection and correction. Finally, the last 24 bits of packet C are not used in the presently preferred embodiment of the invention.

e. The Commercial Decoder

As mentioned above, the communication format of the system of the invention is designed to provide unprecedented flexibility in communication between a broadcaster and a decoder. Primarily, this involves communication of text messages to the subscriber. Nevertheless, it is also desired to utilize the same communication format for commercial applications, such as intra-company video communication, which do not require this capability. Instead what is required is the capability to provide certain signals only to certain decoders, e.g. those at a company's various locations. In this way, for example, an instructional tape can be simultaneously and automatically distributed to a number of locations. The following describes the commercial decoder and the system data it uses.

The commercial decoder is designed specifically to fulfill the requirements of a private satellite communications network. Its distinguishing feature is the method of control, termed Group Control. The broadcaster controls the services which the commercial decoders deliver by Group Control data sent in the Vertical Blanking Interval—there is no means of control available at the decoder (the ON/OFF switch excepted). Only commercial decoders respond to Group Control commands.

Each individual decoder is assigned to a Group by an Addressed Packet. The network is controlled by signalling to Groups of decoders using System Data Packets - Type C. These packets indicate which Groups are authorized to receive the various parts of the B-MAC signal. Several different packets are sent in a sequence in order to define this authorization. Each packet is repeated five times (line 3, fields 9–14: the System Data C interval, as above), to allow for 5:1 majority logic to be applied at the decoder. A new packet is then sent during the System Data C interval of the following session. The complete sequence is known as a Command Sequence.

The Command Sequence defines a "Service Package" by assigning authorization to decode parts of the B-MAC signal to a Service Package Number. Up to eight Service Packages may be defined at any one time. The Command Sequence also signals which Groups are assigned to each Service Package. Up to sixteen individual Groups may be assigned to a Service Package, or (by a single command) all Groups may be assigned to a Service Package. A complementary form of control is also possible: i.e. "Assign All Groups Except . . . ". A list of up to sixteen excluded Groups may be sent.

A Command Sequence is of variable length, depending on the complexity of the control messages being sent. The limits of the Command Sequence are defined by the "Start Command Sequence" packet. This signals the beginning of a new Command Sequence, and implicitly closes the previous sequence. The authorization(s) defined in the Command Sequence are not implemented by the decoders until the "Start Command Sequence" packet of the following sequence is sent.

The advantage of this method of control is that large numbers of decoders can be grouped together and authorized/de-authorized simultaneously, allowing the network rapidly to be reconfigured. To increase flexibility still further, two Group Numbers may be assigned to each decoder. The decoder will gain access to service(s) if either of the Group Numbers is assigned to a Service Package. Group Numbers range from 1 to 255.

7. Transmission of Subscriber Messages

As described above, a primary aspect of the invention described and claimed in the present application is the transmission of individually addressable, encrypted messages from a transmitter to an individual decoder for display to the subscriber. As has been described previously, this is done by using an addressed packet to indicate to an individual decoder that a personal message for the subscriber is to be found in a forthcoming frame. The individual decoder is thus alerted to select that teletext message when it is subsequently transmitted.

a. The Addressed Packets

Figure 13:
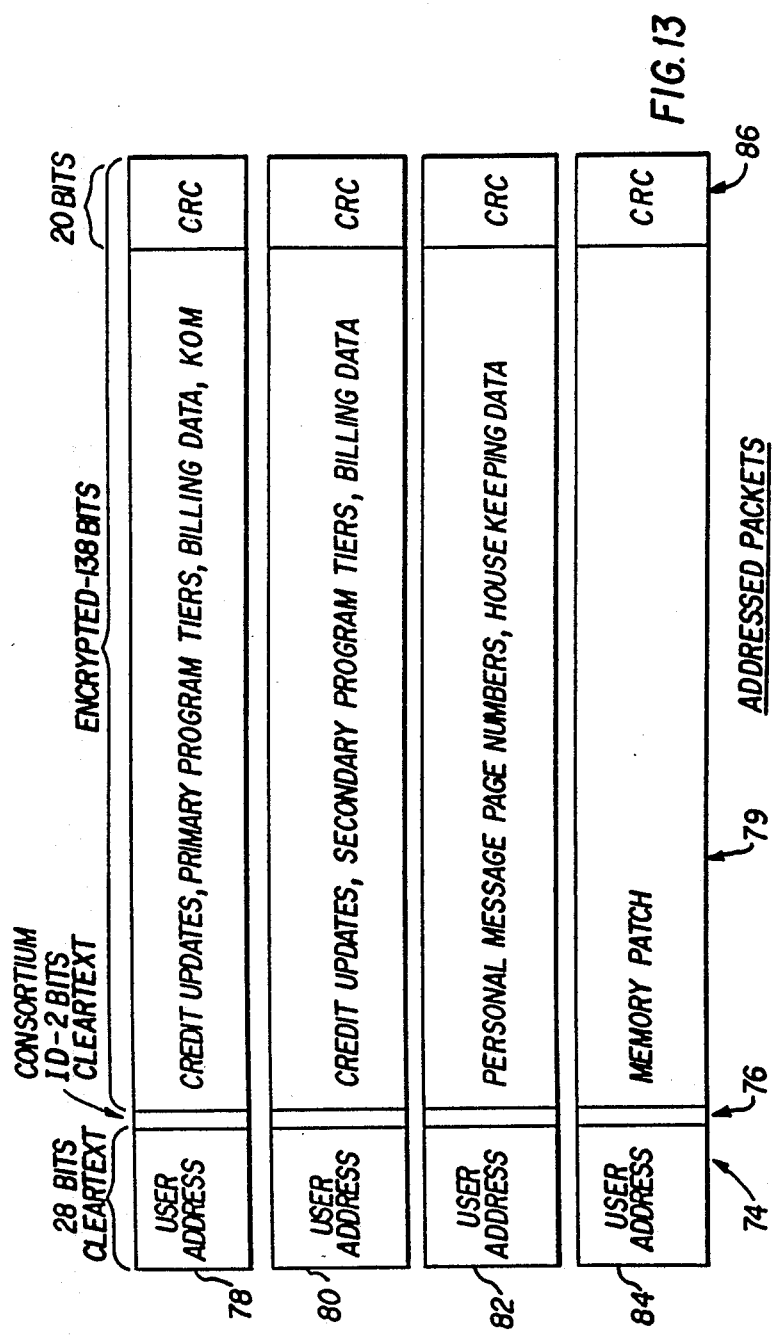
FIG. 13 shows the general arrangement and contents of four different types of addressed packets which can be transmitted in lines 4–8 of the vertical blanking interval.

FIG. 13 shows four types of addressed packets which are made available in a presently preferred embodiment of the invention. Their formats, and the various items of information shown on FIG. 13 as being transmitted by each can, of course, vary as needed, depending on the specific requirements of communication between the transmitter and individual decoders. Therefore, these particular addressed packets should not be considered exclusive or as a limitation on the proper scope of this invention.

The 377 bits of each of the addressed packets are encoded such that they can decoded by a one-half rate forward error correcting code. This reduces the number of useful bits to 188, which is the total appearing in each of the several possible addressed packets shown in FIG. 13. In each case, the first twenty-eight bits, indicated generally at 74, are the subscriber or user address which is transmitted in clear text, that is, is not encrypted. This acts as a label for recognition by the target decoder. The twenty-eight bit user address allows a maximum of 268,000,000 decoders to be addressed by an individual broadcaster. A non-encrypted two-bit consortium identification 76 is also provided in each of the addressed packets. This identifies a broadcaster or a group of broadcasters. The remainder of the addressed packet is encrypted, as indicated. This includes 138 bits of various keys, credit updates and program tiers which the subscriber's decoder is authorized to access, and twenty bits of cyclic redundancy check data for error detection and correction of the 138 bits just described. Four of the encrypted bits, possibly in conjunction with the consortium identification bits, identify the addressed packet format of a particular line.

The data transmitted in the addressed packet can vary quite widely, as indicated generally in FIG. 13. For example, in a first addressed packet 78, the "message portion" 79 of the addressed packet may include credit update information, may identify the primary program tiers, that is, the classes of programming for which the subscriber has paid and therefore is entitled to view, other billing data, and importantly the key-of-the-month (KOM). The KOM is varied once per month, and is used together with a secret serial number which is permanently written into memory comprised by the decoder. The key-of-the-month is the same for all decoders, but is individually transmitted to each. This allows deauthorization of individual decoders as needed by the broadcaster. The key-of-the-month is used together with the secret serial number of each of the individual decoders, to provide a decryption key which is unique for each decoder. As will be appreciated by those skilled in the art, this provides a very high level of security to the system. It also requires that the key-of-the-month be reliably detected by the decoder.

In order to accomplish this goal, the primary addressed packet 78 is transmitted on a regular basis throughout the month, e.g., on the order of once every hour or so. In the preferred embodiment of the decoder of the invention, the "intelligent" portion of the system is always enabled, whether or not the subscriber is actually watching his television at the time, such that the key-of-the-month is reliably received, even if the subscriber rarely watches television. The key-of-the-month for a subsequent month can also be transmitted so as to be received in advance of the first day of the month so that no service interruption is likely to occur; as described above, a key-of-the-month odd/even bit transmitted as part of the system data can be used to indicate which is to be used in decryption of any given signal portion.

A second addressed packet format is shown at 80. This addressed packet is transmitted regularly only if the consortium wishes to make use of more than the forty program tiers which can be separately identified within the primary addressed packet 78. If it is used, it may also include credit update information and other billing data as indicated, as well as the secondary program tier information shown.

Other addressed packets are shown at 82 and 84. These may contain a variety of data as indicated. For example, a third format shown at 82 may include personal message page numbers and system housekeeping data. The personal message page numbers are used by the decoder to select appropriate teletext lines from subsequently broadcast frames. The fourth addressed packet format shown at 84 is a memory patch address packet, which is used to modify the memory contents of a particular decoder, for example, in the event of a change of address or to correct certain fault conditions.

b. Teletext Communication

There are a number of important objectives of the communications system of the invention which have a direct impact on the design of the teletext communication format employed. One of the most significant features is the fact that teletext messages to be displayed are to be selectable in several ways to provide flexibility to the system. For example, it was deemed highly desirable that the system be "menu-driven", that is, that the user be provided with screens showing help pages, diagnostic messages, programming schedules and the like, and that he be able to readily move through them at his own option. In order that the decoder can be economically manufactured, the large quantity of data required to provide the many screens showing these requirements cannot be stored at the decoder, as the amount of memory capacity required to store all this data would be prohibitively expensive. Therefore, as much of the data as possible is stored at the transmitter location. On the other hand, because it is highly undesirable that a continuous uplink or landline connection be provided between the decoder and the transmitter, i.e., to allow the decoder to cause the transmitter to send particular data needed, all this information has to be made available to the decoder on a regular basis, such that it can select the data it needs, for example, to construct the various personal messages or to implement the other desired features. Therefore, the teletext messages, at least insofar as they are identical for all subscribers, are transmitted repetitively, and the decoders are enabled to select those which they require, for example, in order to respond to the user's commands as input from a key pad.

It is also important that the decoder itself be able to initiate messages. Because the decoder performs the billing function and retains all information relating to the current billing status of the subscriber, the decoder must be able to construct a screen message to display this information to the subscriber as needed. As above, it was considered undesirable to store all the information needed to generate a text screen at the decoder, as this would have been prohibitively costly of memory. Instead, only the user-specific data is stored at the decoder; message "templates" are regularly transmitted as teletext pages, and the decoder selects the proper template for display of billing information and completes it by insertion of the user-specific information.

Finally, it is important that the system itself be able to urge a teletext message upon the decoder and hence on the viewer, for indication of emergency conditions, for announcing changes in service, and for providing personal messages to the subscriber, among other reasons.

In a particularly preferred embodiment, such broadcaster-initiated messages can be "forced", that is, so that they are displayed immediately upon actuation of the user's television, or can be "unforced", such that the user is provided with an indication that a message is waiting, but is not obliged to view it immediately.

These diverse uses and objectives of teletext communication are achieved by the present invention, according to which teletext is transmitted in a bipartite format. Teletext according to the present invention is transmitted in the form of a number of text lines or rows, making up a page of text. The rows making up the page are preceded in transmission by a teletext header. The header indicates the fact that a teletext page follows and indicates its page number. A decoder looking for a particular page number, for example, a template page, scans the teletext page numbers provided in the teletext headers for the particular page of interest. When the page number sought is detected, the decoder then selects the following page, that is, selects for storage all the teletext lines which follow until the next teletext header line is identified.

c. Line Formats

FIGS. 14 and 15 show respectively the formats of the teletext header and text lines. In FIG. 14, the teletext header 90 is shown as comprising a thirty-two bit teletext identifier 92. This field simply indicates that this particular line of the vertical blanking interval is a teletext line, as opposed to, for example, an addressed packet. The next thirty-two bit area 94 contains various control flags, which will be returned to momentarily for discussion. The teletext header then contains a 128 bit field which identifies the page number which is comprised by the following text lines, as indicated at 96. In the preferred embodiment, the page number is a sixteen bit number, each bit of which is encoded as an eight bit byte. The flags 94 are similarly encoded; that is, a flag which is either a "1" or a "0" is nevertheless encoded as an eight bit byte for transmission, so as to render its correct detection more probable than if it were simply a single bit flag. For the same reason, the page number is a 128-bit word in which each eight-bit byte indicates whether the corresponding bit is a 1 or a 0, again for extremely reliable detection of page numbers. Finally, the last 165 bits 98 of the teletext header 90 are not used.

The flags 94 include a header flag 94a which indicates whether the teletext line is a header or is not, a linked page flag 94b indicating whether the subsequent page of teletext is one of a number of "linked" pages related to the present page, an encrypted page flag 94c indicating whether the subsequent page is encrypted or not, and a box page flag 94d indicating whether the text shown in the subsequent page should be displayed against a video background or a black background.

The significance of the flags is as follows. The header flag 94a simply indicates whether a particular teletext line is a header or is a line of text. The linked page flag 94b is used to signify to the decoder that a subsequent page contains data needed to complete the message begun in the present page. For example, if a teletext message is too long to fit into a single page comprising twenty 40-character lines of text, the user typically will desire to see the subsequent text page. The linked page flag 94b is used to alert the decoder to this fact and to cause it to copy the page of text having the next higher page number into a random access memory, such that if the user then indicates that he wishes to see the subsequent page of text, it is already stored in the random access memory. In this way, the entire message can be displayed more or less immediately, as opposed to waiting for a subsequent transmission of succeeding pages, which may take on the order of several minutes in a very busy system. The linked page flag 94b thus provides an opportunity to improve the teletext service to the user. More particularly, any number of pages can be linked to provide lengthy text messages, e.g., stock price quotations or the like, which can efficiently be read in sequence.

The encrypted page flag 94c indicates whether the text found in the subsequent text lines making up a page is encrypted or not. In many cases, of course, there is no reason to encrypt the teletext, for example, if the message is not private, or if its loss will not be damaging to the system integrity, as would be, for example, the loss of control over a first-run motion picture or the like. Hence, many teletext lines are not in fact encrypted.

Finally, the box flag page 94d indicates to the decoder that the teletext in a subsequent page is to be superimposed over whatever video is on the screen at the time, instead of being displayed against a plain background. This flag is useful for several purposes. For example, closed-captioned teletext, providing lines of dialogue and the like so that the hearing-impaired can follow the text of a film, is clearly best provided in this way, such that a viewer can simultaneously see the text and the video. On the other hand, important system messages, such as warnings of community dangers and the like, may be more dramatically or effectively presented against a plain background. Hence, this option is provided and is controlled by the box page flag 94d as noted.

As mentioned, each of the four flags 94 is transmitted as an eight bit byte rather than as a single bit flag, to render the detection and decoding process more certain and thus to reduce overall system errors. As mentioned, the bits making up the page number, which identifies the succeeding page of text, are similarly encoded, such that a sixteen bit page number occupies 128 bits of the teletext header.

FIG. 15 shows the structure of an individual text line 100 up to twenty of which may make up a page of text. As in the case of the teletext header of FIG. 14, the first thirty-two bits 102 of the text line 100 are a teletext identifier. These are identical whether the teletext line is in fact a header or is a text line. The next eight bits are a header flag 104, which is identical to the header flag comprised by flags 94 of the header line 90, that is, it is an eight bit byte indicating that the teletext line is in fact a text line 100 and not a teletext header 90. The following 320 bits are devoted to the transmission of forty bytes of textual data. Typically, these are encoded according to the usual ASCII standards, whereby each byte is seven bits of data plus a parity bit for error detection. Thus, each text line transmits forty characters which may be any alphanumeric character found in the ASCII character set. The last seventeen bits 108 are not used.

Thus, in practice, the broadcast transmitter transmits a sequence of teletext lines in lines 9–13 of the vertical blanking interval (see FIG. 5). Up to twenty text lines 100 may follow each teletext header 90. The teletext header 90 contains a page number 96 which identifies the following text lines as, for example, belonging to a template useful in displaying billing status, or as being the current information concerning the current movie being run, that is, describing its title, its lead characters, its length, and the price the subscriber will be charged for viewing it, or the like. It will be appreciated, therefore, that the teletext lines in any given vertical blanking interval may be all text lines 100, since only five teletext lines can be transmitted in a vertical blanking interval. (It will be appreciated by those skilled in the art that this numerical limitation relates to a 525-line NTSC-type signal; the actual numbers of the lines in the VBI are different in the PAL type 625-line system.)

C. Teletext Message Processing

1. Message Origination

Figure 16:
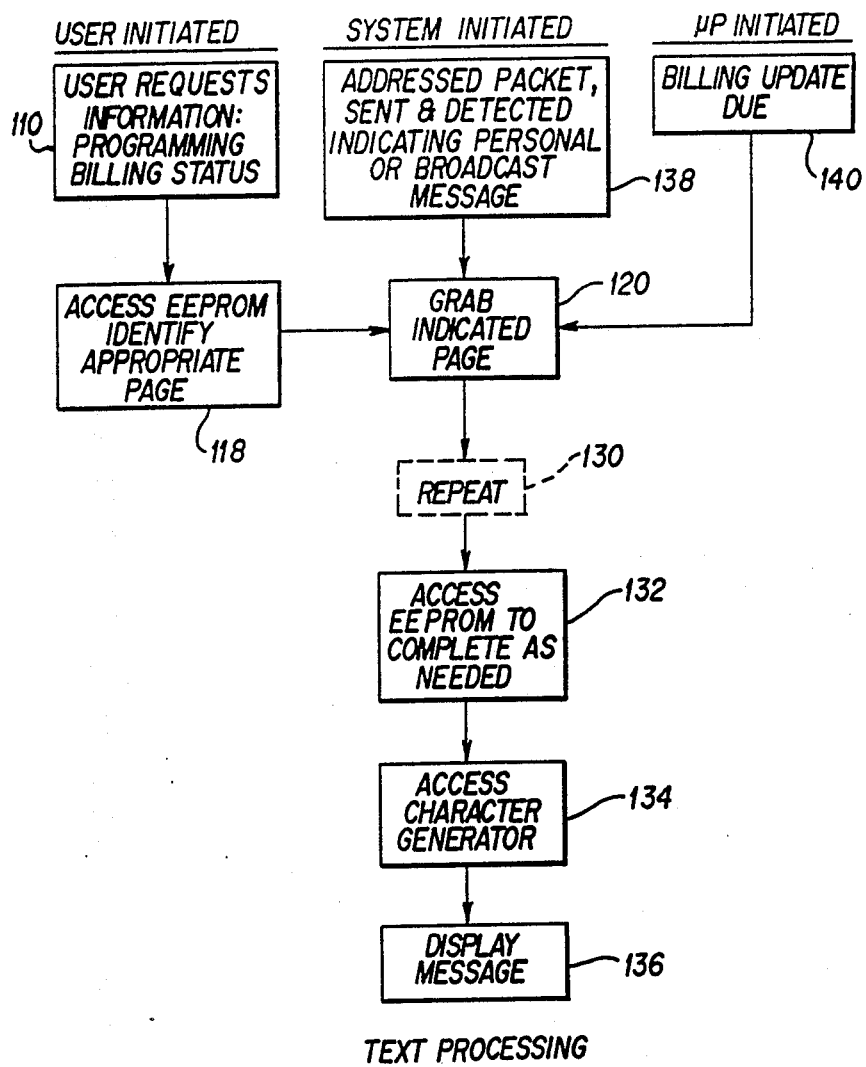
FIG. 16 shows in flow chart form the steps taken which result in display of a teletext message on a subscriber's television screen.
Figure 17:
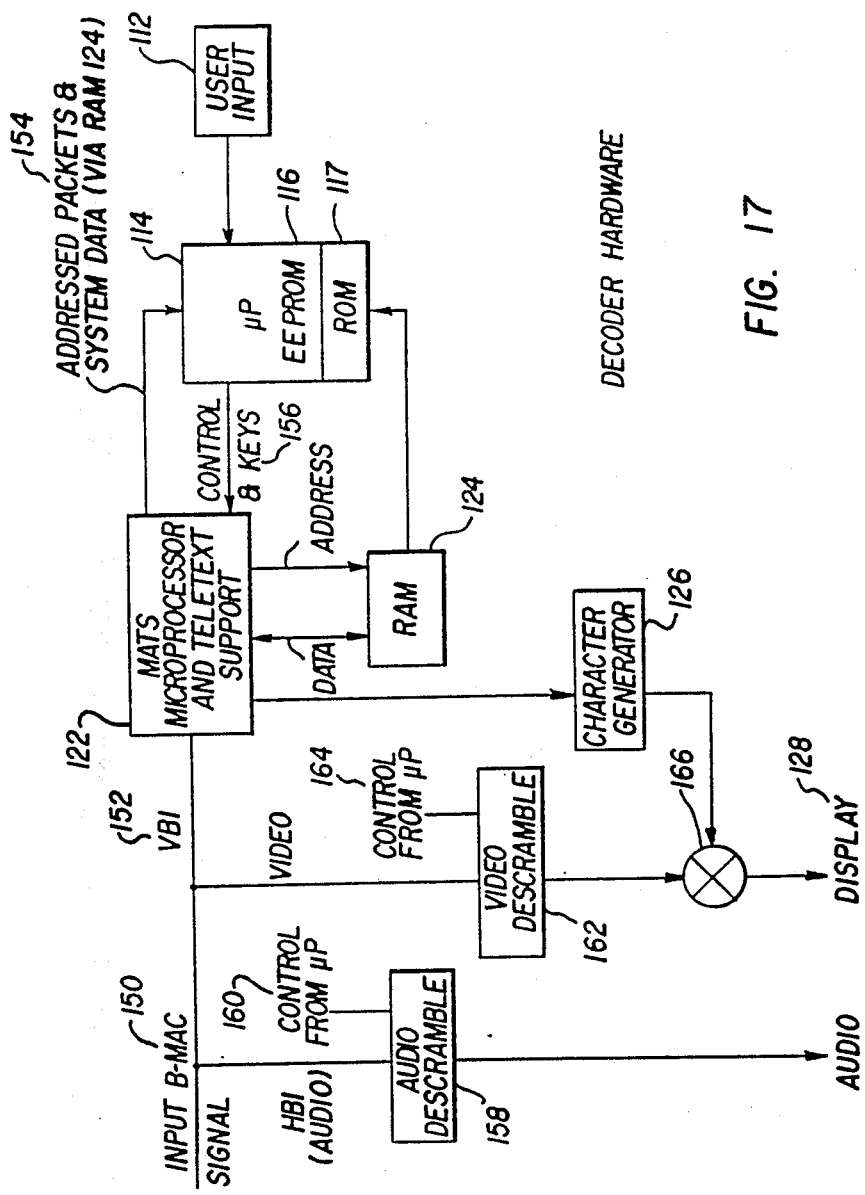
FIG. 17 shows the hardware of the decoder used for display of teletext information.

FIG. 16 indicates in flowchart form the steps taken which result in the display of a teletext message on a subscriber's television screen in the system according to the invention. FIG. 17 shows in schematic form the hardware of the decoder which is used to perform this function, as well as the ordinary video processing. The following discussion of teletext processing may benefit from simultaneous consideration of both figures.

As mentioned above, in a preferred embodiment of the invention, a teletext message can be generated in response to a user-initiated request, in response to the decoder determining that a particular message should be given to the subscriber, or in response to the broadcaster's transmitting a message to the individual subscribers. FIG. 16 shows how these three forms of initiation of a message all result in a display thereof. The user-initiated service path begins on the left side of FIG. 16 at 110. For example, suppose the user wishes to see on his screen the current program material being transmitted, or wishes to check his billing status. He presses the appropriate key or combination of keys of a key pad, as indicated at 112 of FIG. 17. The decoder comprises a microprocessor indicated at 114, which accesses an electrically erasable programmable read-only memory (EEPROM) indicated at 116 to determine which teletext page number provides the appropriate template for this information, as indicated at 118. In the preferred embodiment, the microprocessor 114 is a "secure" microprocessor, meaning that it cannot be tampered with or its software read out or altered without destroying it, and the EEPROM 116 is comprised therein. As indicated at 120, the decoder then "grabs" the indicated page when the teletext header including the appropriate page number is received by "grabbing" the teletext lines which follow the teletext header thus identified.

As shown in FIG. 17, the microprocessor 114 is assisted in its operations by a chip referred to as MATS 122, these letters being an acronym for Microprocessor and Teletext Support. In the preferred embodiment of the invention, MATS 122 receives the page number from the microprocessor 114 and compares all incoming teletext header page numbers with this number. When MATS 122 detects a coincidence, it then copies all succeeding text lines until a further teletext header is detected, and stores these text lines in a random access memory (RAM) 124. It subsequently causes these to be read out and passes them to a character generator 126, which integrates them with the video signal and displays these on the subscriber's television as indicated at 128.

As indicated at 130 on FIG. 16, in a preferred embodiment, the step of grabbing independent pages is repeated. This is to ensure that the teletext page lines are correctly received. In a particularly preferred embodiment of the communications system of the invention, all teletext pages are transmitted in duplicate, one header being followed immediately by its corresponding text lines and a second identical header, which is then followed by the same lines of text, so that this second step 130 of grabbing the communicated page can be performed at once rather than waiting for a subsequent transmission of the same page, which might take place on the order of seconds later. The idea, of course, is to serve the user's convenience. The second copy of the page is stored at the same location in RAM 124 as the first, such that any blanks in the first copy which were caused by parity errors in the teletext data portion 106 (FIG. 11) will be completed, on average, by the second grabbing of the same information.

Should the page grabbed at 120 have been a template page, subscriber-specific information is needed to complete the information. For example, if the user requests a billing status update, the page grabbed will include such things as column headings, and the titles of various data items forming part of the billing display. For example, it might list the last 10 programs in a row purchased, total the prices paid, subtract this from the outstanding balance at the last credit information request, and display a new balance. Such information as titles, e.g., "Programs Purchased", "Price Paid", and "Credit Balance", will be transmitted as part of the template. For example, the numbers of the programs purchased, the prices paid and the credit information may be stored in the electrically erasable programmable read only memory 116 (FIG. 17) and are used to complete the template page as needed, as indicated at 132. The complete ASCII encoded stream of bits is then supplied to a character generator 126, as indicated generally at 134, which in turn is used at 136 to supply a complete video signal to the display unit 128.

FIG. 16 also shows as mentioned the steps taken when the system initiates the display of a message on the user's television screen and when the decoder initiates such a step. For example, suppose the broadcaster wishes to send a particular subscriber a personal message, or wishes to announce an increase in the price of a service, the availability of a new service, or the like. At 138, the transmitter causes an addressed packet to be sent indicating that a personal message is available at a particular page number. For example, the addressed packet format shown at 82 of FIG. 13 would typically be sent. The MATS 122 in this case would recognize the subscriber's identification number in the addressed packet and send it to the microprocessor. The microprocessor will then return the page number to the MATS 122 which can thereafter grab the indicated page as shown at 120 and process and display the message as above.

As mentioned above, in some cases it is considered desirable that a personal message or broadcast message be "forced", that is, immediately displayed upon the user's next turning on his television set, or superimposed over any programming which he might presently be viewing. In such a case, a "forced message" bit is set in the addressed packet indicating that a teletext message is being sent to the subscriber. This is detected by the microprocessor in decoding the addressed packet and is used to control the display of the teletext accordingly. In other cases, if this bit is not set, the microprocessor may simply alert the subscriber that a personal message has been received, e.g., by lighting a lamp on the control panel; he may then view the message when convenient for him.

A third method of initiating a message is shown beginning at 140 of FIG. 16. In this case, the microprocessor initiates the message. For example, when it detects that the subscriber's credit level is running relatively low, it should alert him that he should arrange for increased credit by sending the broadcaster a payment. Thereafter, of course, the broadcaster will transmit an addressed packet to the decoder, which is detected by the microprocessor and used to update the billing records. In this case, the microprocessor 114 selects from a ROM 117 the page number of an appropriate template for displaying to the user his billing status. The ROM 117 stores the microprogram which is run by the microprocessor, and which includes the page numbers. Responsive, for example, to a user input, the microprocessor 114 sends the appropriate page number to MATS 122. MATS 122 thereafter compares the page numbers of all incoming teletext pages until it detects this particular page. When it does so, it copies this template into RAM 124. It then completes the page by inserting the user's various billing information into the template and displays it at 136.

It will be appreciated that there has been described an extremely flexible method of providing individually addressable teletext messages to a subscriber in a subscription television system. Additional possibilities and features can now be discussed as well. For example, the user initiated teletext scheme disclosed in connection with FIG. 16 at blocks 110 and 118 indicates that the user may initiate teletext display by pressing a button on a key pad causing the decoder to then select appropriate messages from the broadcaster. Another possibility would be "pay-teletext" in which the user would select teletext information as one of his ordinary tiers of programming material. For example, such information might include financial quotations, electronic bulletin boards, flight information, computer shopping services, various sorts of information retrieval, and other forms of information in which the user can select items from a database using a menu-driven system. Of course, the system is limited as compared to an interactive database by the fact that the decoder is only permitted to display messages selected from those sent by the broadcaster; the messages sent by the broadcaster are not transmitted responsive to specific requests from the decoder, as in the case of conventional remotely accessible database management schemes. However, it is believed that such "pay-teletext" may nevertheless have utility in cases where the amount of text to be viewed is relatively limited. For example, the user might select Wall Street or Chicago Board of Trade quotations, or world-wide gold prices from a menu of a wide variety of financial information services. "Pay teletext" could also be used to provide individuals with access to Reuters, United Press International, Associated Press and other news-gathering services not generally available to the public. According to the present invention, such a pay teletext scheme could be very simply implemented using the addressed packet/teletext transmission arrangements previously discussed.

To conclude the discussion of FIG. 17, the B-MAC signal is input at 150. The data contained in the vertical blanking interval (VBI) is shown at 152 being passed to MATS 122 for processing as discussed above. The MATS examines the user numbers of the addressed packets and supplies those bearing the correct number to the microprocessor. The addressed packet and system data are directed as shown at 154 to the microprocessor 114 for generation of control signals and decryption keys, transmitted at 156 to the MATS. Meanwhile, the remaining portions of the vertical blanking interval data, the teletext material, is processed by MATS 122. In general, the teletext data is stored in RAM 124 and is subsequently supplied to the character generator 126 after decryption using the encryption keys provided at 156 by the microprocessor 114. As mentioned above, if a particular text header indicates the presence of a linked page, a second page of text will be selected by MATS 122 and stored in RAM 124 for supply to the character generator 126 upon request thereof by user input at 112.

FIG. 17 also shows schematically the processing of the audio information contained in the horizontal blanking interval (HBI). This is sent to an audio descrambling unit 158 which receives a control signal from the microprocessor at 160 for controlling access to any pay-audio services which may be provided by a broadcaster. Somewhat similarly, the video signal is sent to a video descrambler 162, which is also supplied by the control signal from the microprocessor at 164, providing the descrambling information necessary and preventing access of the subscriber to programs to which he is not entitled, using the information contained in the addressed packets, all as discussed above. The video signal is combined in mixer 166 with the teletext video from character generator 126 and supplied to a display unit 128 as indicated.

As indicated at the caption 154 in FIG. 17, the addressed packets and system data, separated from the remainder of the vertical blanking interval data by MATS 122, are supplied to microprocessor 114 via RAM 124. This is because, in general, the microprocessor 114 is much slower than the MATS 122, so that the RAM 124 is useful as a data buffer.

In the embodiment of the system of the invention described above, each addressed packet is individually addressed and received. This places a limitation on the throughput of the system, that is, it limits the number of individual packets which can be sent. To alleviate this problem, a "bank addressing scheme may be employed. In this embodiment, the decoders are divided into "banks" and are assigned to users having characteristics which make it likely that messages may be commonly addressed to them, for example, common time-zone residence, common language, etc. Each of the decoders in a bank responds to the same 28-bit user address, that is, each receives the same addressed packet. Further, each decoder in a bank has written to it at manufacture a six-bit member code. A bank-addressed packet includes a number of "packet enable" bits, each one of which is assigned to one of the decoders of the bank. Thus, when an addressed packet is received, the stored member code is used to determine whether the corresponding packet enable bit is set; if so, the other addressed packet functions described above are enabled. A single data bit can also be transmitted to each decoder similarly, as part of a second group of bits in an addressed packet corresponding to the packet enable bits; again, the member code is used to identify the corresponding one of the second group of bits. In this way, one-bit individual messages can be communicated to a number of individual decoders by transmission of a single addressed packet.

2. Partition of Decoder Functions

Figure 18:
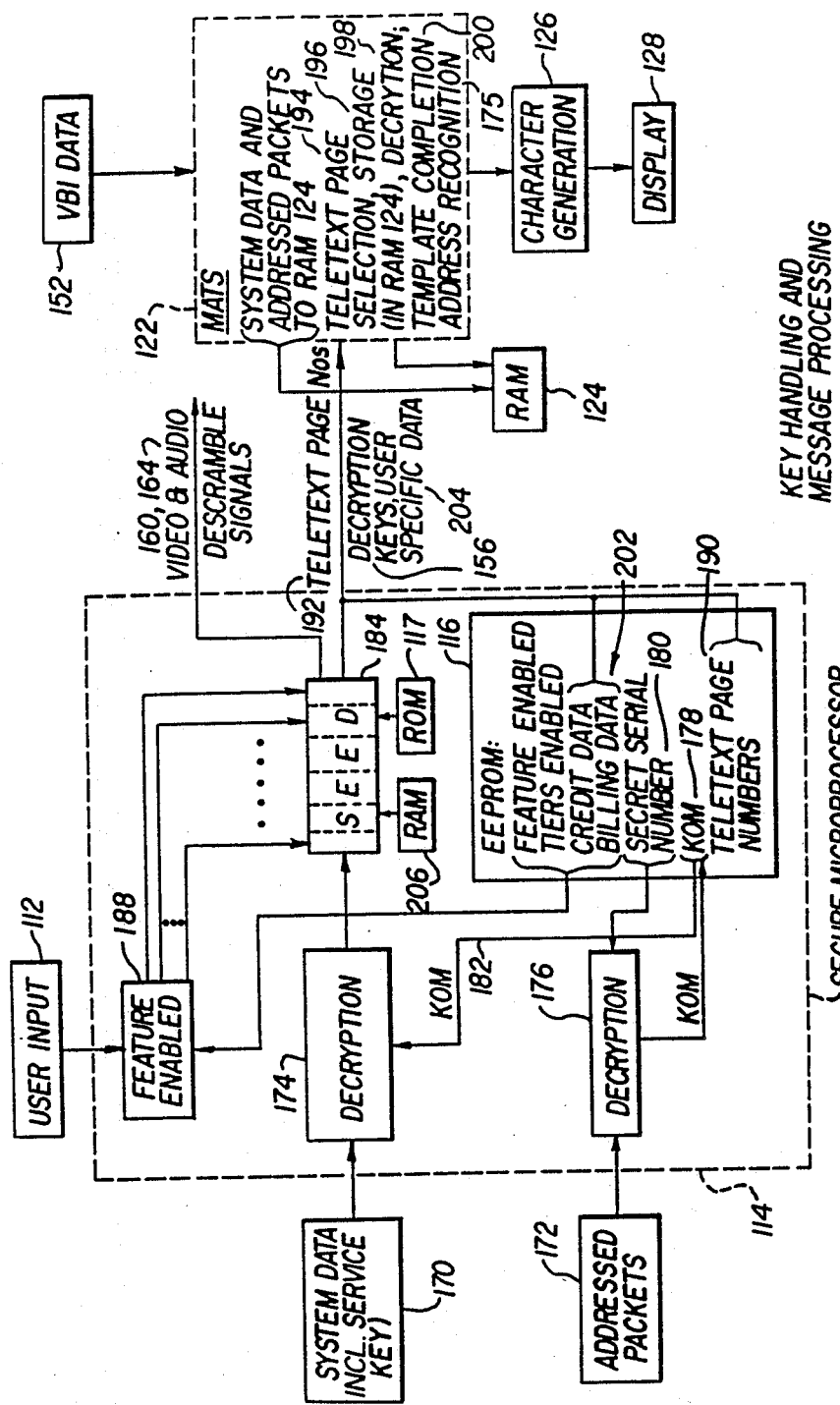
FIG. 18 details the relative arrangement of the microprocessor and teletext support chip (MATS), its connection and relationship to the microprocessor, and the functions performed by each.

FIG. 18 shows the key elements of the decoder shown in FIG. 17 in significantly greater detail, an indicates in block diagram form the functions performed thereby. As discussed generally above, vertical blanking interval data indicated at 152 is supplied to MATS 122. At this point, system data and addressed packets are stored in RAM 124 for later accessing by the microprocessor 114 as indicated at 170 and 172, respectively. The system data taken from RAM 124 at 170 includes the service key, which as discussed above changes with every 16-frame cryptocycle, that is, each time a complete set of system data has been transmitted, all as discussed above.

The addressed packet data supplied to RAM 124 by MATS 122 is supplied at 172 to microprocessor 114. As mentioned above, the user address portion of the addressed packet, which as noted above is transmitted in clear text, is compared by MATS 122 to a decoder identification number, stored therein at manufacture as indicated at 175. If the numbers match, such that the addressed packet is appropriate for processing by the particular decoder, the remainder of the addressed packet is supplied to microprocessor 114 as indicated at 172 and decrypted at 176 using a secret serial number which is stored in the electrically erasable programmable read only memory (EEPROM) 116 at manufacture of the device, as indicated at 180. Preferably, a bar coded label is attached to each microprocessor chip at manufacture. An assembly worker wands the bar coded chip so that this bar code identification is supplied to an associated computer device. Thereafter, the computer associates a secret serial number with that decoder number without requiring operator intervention. The computer then writes the secret serial number to the EEPROM 116. The correlation between the decoder identification and the secret serial number stored in EEPROM 116 is critical to the proper functioning of this system. Therefore, this information is guarded very carefully.

The output of decryption unit 176, in addition to the other data contained in the addressed packets as discussed above, includes the key-of-the-month (KOM), which as mentioned is transmitted repetitively over a period of a month, and in advance of the month in which it is to be effective, all such that each decoder can obtain the key-of-the-month well in advance of its being required for decoding of program material. The odd and even KOMs are stored (for each broadcaster, as noted above) in the EEPROM as indicated at 178. The selected KOM is supplied as indicated at 182 to a further decryption unit 174 and is thereafter used to decode the system data. As mentioned, the system data is transmitted frequently and repetitively, on the order of every one-third second, to keep the system control data up to date.

The output of decryption unit 174 is supplied to a "seed" 184. The seed 184 is intended to refer generically to means for generating a number of control signals and decryption keys which are, in effect, the outputs of the microprocessor. For example, the seed output includes video and audio descramble signals supplied at 160, 164, respectively, to audio and video descrambler 158 and 162, respectively, as discussed above in connection with FIG. 17. Similarly, the decryption keys are passed as indicated at 156 to MATS 122 for decryption of teletext data, such that personal messages can be decoded by the MATS from the encoded incoming VBI data 152.

The seed 184 also has as inputs to it a number of signals from a device identified generically as feature enabling unit 188. This unit receives an input from the user input key pad 112 and also a number of inputs from the EEPROM 116. These latter inputs include such things as the tiers enabled, that is, the classes of programs which the subscriber is permitted to watch. As discussed above, the system data 170 supplied to the microprocessor 114 includes program tier data indicative of whether a program being broadcast at any given moment belongs to a particular tier. Therefore, the seed combines the tier data from EEPROM 116, via the feature enabled unit 188 and the system data input at 170, to determine whether to permit video descrambling, as indicated by the video enable signal 160. This tier data, as discussed above, can also be used to control access of the subscriber to teletext data which may be provided on a pay-teletext basis by way of supplying teletext page numbers to MATS 122.

Teletext page numbers are also supplied to MATS 122 when, for example, the user desires to view the programming guide. In this case, the microprogram run by the microprocessor, which is stored in ROM 117 at manufacture, responds to the appropriate key pad input by sending the appropriate teletext page number to the MATS, as indicated at 192. Thereafter, as discussed generally above, the MATS 122 reviews the page numbers of all incoming teletext headers for the appropriate page number, and when it detects a match, grabs the subsequent text pages as indicated at 194. If the linked page flag indicates that the teletext message extends over more than one page, it selects plural teletext pages and stores those not immediately displayed, as indicated at 196, in RAM 124. If they are encrypted, as indicated by the encrypted page flag, it decrypts them, as indicated at 198, using the key supplied at 156. Finally, if the page is a template, it completes the template by inserting user specific information, as indicated at 200. The user specific information can include billing data stored in EEPROM 116, as indicated at 204; this may include credit data indicating the user's credit status, billing data including, for example, what programs he has recently purchased, should he desire to review his purchases, and the like, all generally as indicated at 204.

The secure microprocessor 114 may also include within it a relatively small RAM indicated at 206. This can be used to store data which is permitted to be volatile, that is, lost upon power-off to the unit, unlike the data which is stored in the EEPROM, which is retained even if power is lost to the unit. Data suitable for storage in RAM 206 includes such things as the user's selection of audio channels, and other user-selectable data.

Figure 19:
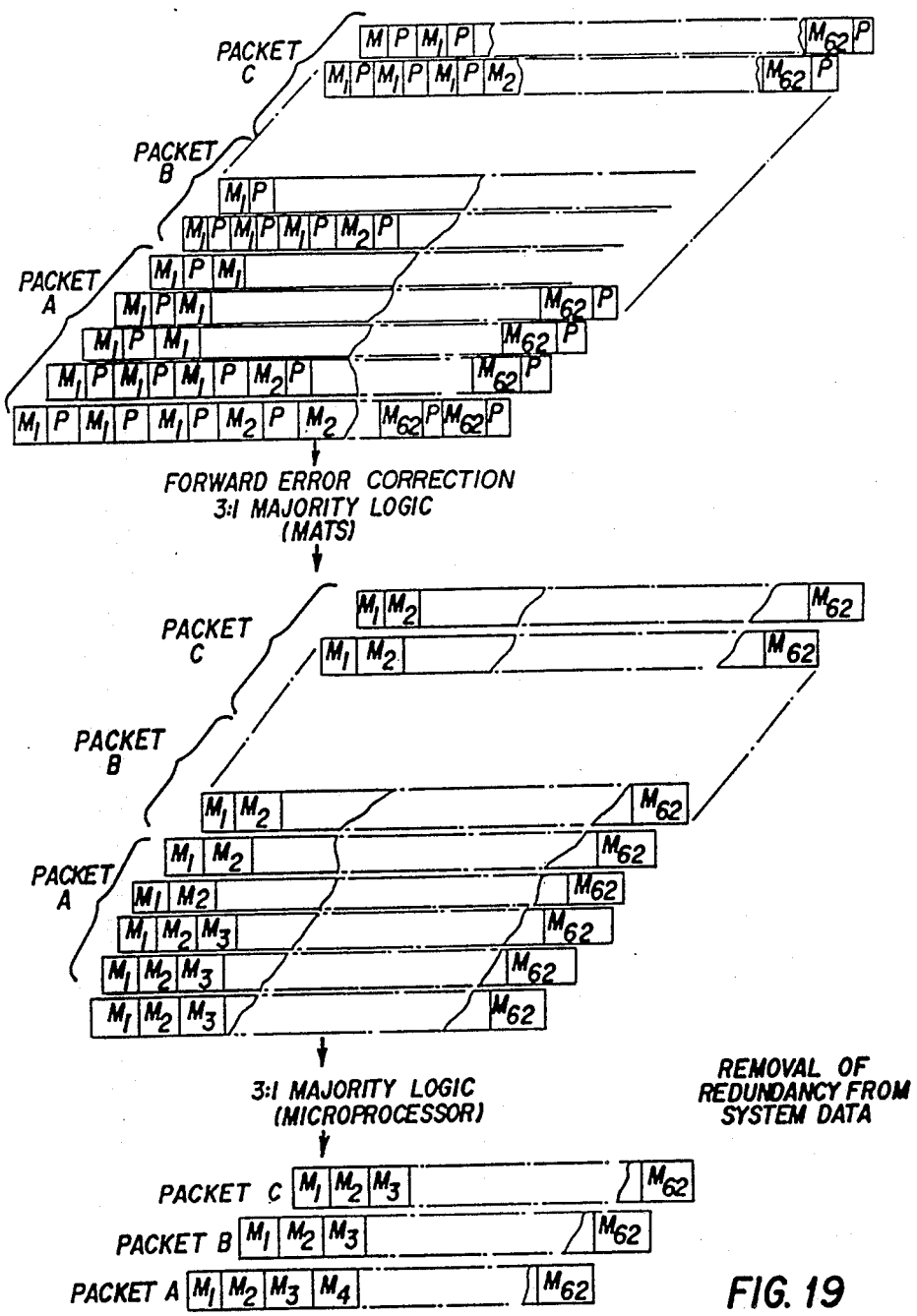
FIG. 19 shows the processing of the system data by the MATS and the format in which it is supplied to the microprocessor.

FIG. 19 shows schematically another example of the division of function between MATS and the microprocessor. As described above, the system data, which must be accurately received by all decoders in the system, is transmitted with a high degree of redundancy and together with error correction information, such as to improve the odds of its being received. In particular, more system data is required than can be transmitted in a single line of the VBI, given the heavy duplication employed for reliability, and therefore the system data is transmitted in three packets, described in detail in FIGS. 10–12, one of which is transmitted during each VBI at line 3. Within each of these three lines, each bit of each of the packets is transmitted in triplicate and each of the three bits is provided with a parity bit, such that a total of 30 bits must be processed to yield a single bit of system data. (3 bits/line×5 repetitions of each line×2, for the parity bit). As shown in FIG. 19, the microprocessor and MATS each contribute to the reduction of the system data through a ratio of 30:1. MATS performs parity check and 3:1 reduction, while the microprocessor performs the final 5:1 majority logic voting. Note that the bit duplication is done both in a single field and over a number of fields. This is such that errors of different types are separately dealt with and eliminated. Gaussian noise will typically affect a single field so that the duplication of data across plural fields will enable its recovery. On the other hand, errors in the same part of the line of each field can be avoided due to duplication of the bit in each field. MATS performs the priority correction and 3:1 voting because these can be done in real-time at high speed; the microprocessor performs the 5:1 voting because this requires memory.

D. Use of System Data

Figure 20B:
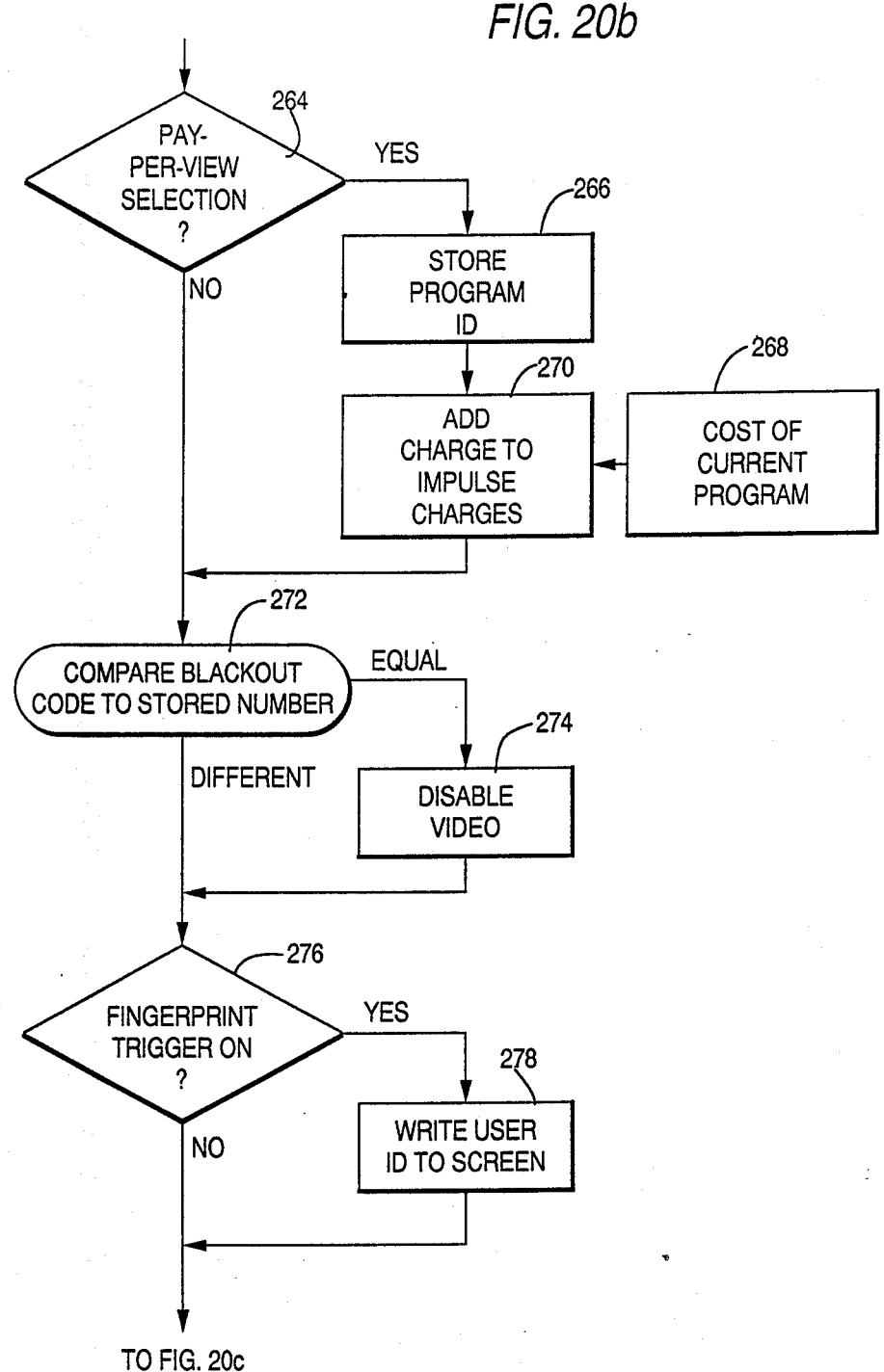
Figure 20C:
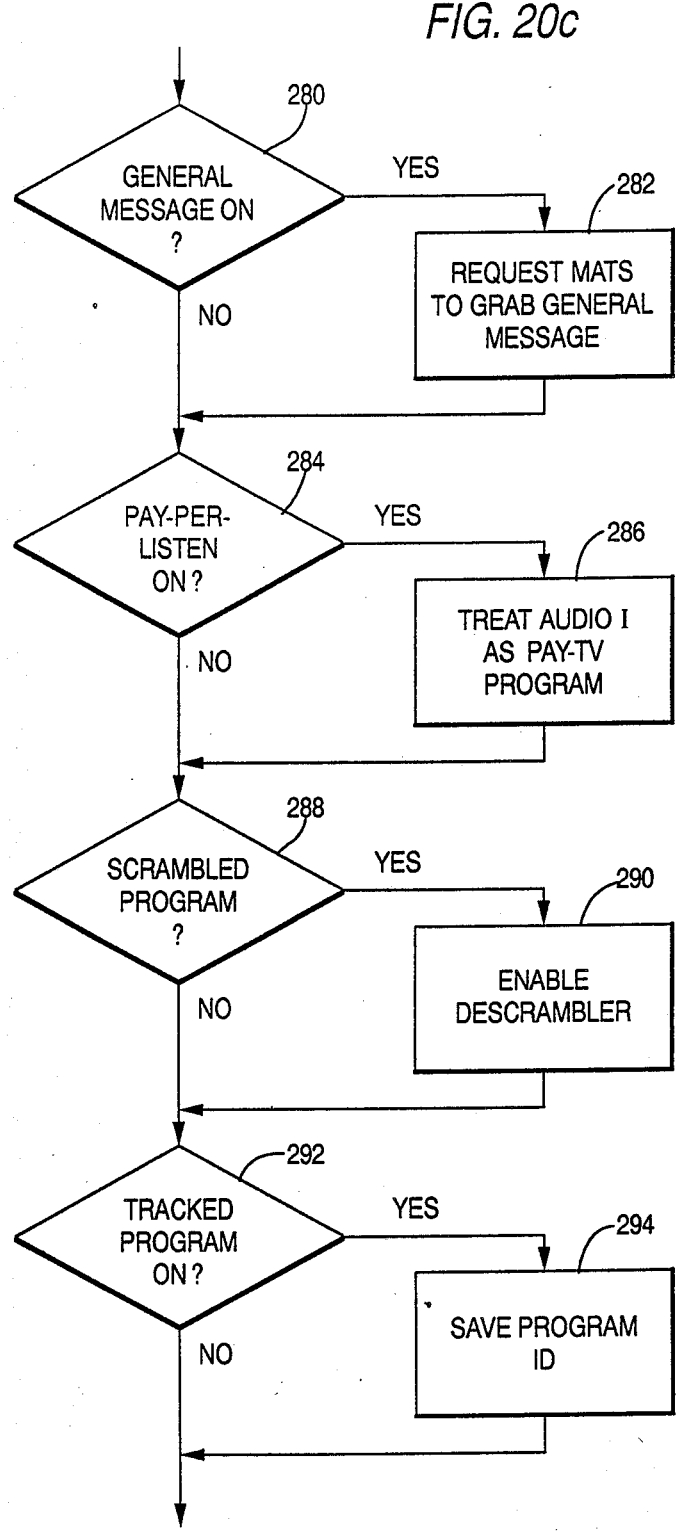

FIG. 20 comprising FIGS. 20a, 20b and 20c shows in schematic form the processing steps carried out by the decoder in handling the system data. Only the more significant steps, involving those bits of the system data relevant to control of the program signal, are described. Other bits listed in the full description of the system data provided in connection with FIGS. 10, 11 and 12 are omitted. It is believed that those skilled in the art will have no difficulty understanding the processing of the other system data items not specifically described in the flow chart of FIG. 20.

The system data is supplied at 250, e.g., from the MATS to the microprocessor, as indicated in FIG. 19. The microprocessor subdivides the system data into the various fields described in connection with FIGS. 10–12. It then processes it generally as indicated in connection with FIG. 20. Thus, at 252 the key source code which is as described above in connection with FIG. 10, is evaluated. If, as described above in connection with FIG. 10, the key source code is 0, the microprocessor uses a stored FAIL key for decryption of the audio and video; if it is 1, it uses a TEST key. Both of these are provided so the system can override the ordinary security provisions in order to test the decoder as required. If the key source code is 2, the even key-of-the-month (KOM) is used; if 3, then the odd KOM is used. As described above, at any given moment, each decoder will have stored two KOMs per broadcaster transmitted to it as part of the addressed packets. This is done such that a key-of-the-month is always available, such that the decoder need not immediately detect the key-of-the-month when it is changed at the end of a given month.

At 254, the encrypted program bit is evaluated. If this bit is not raised, the program decryption feature need not be enabled at 256. At 258, the segment identification is stored. This is used as described below to identify the program identification. At 260, the program tier is evaluated using tier controls stored as indicated at 262. As described above, the addressed packets include identification of tiers of programs to which the user is to be permitted access, while the system data transmitted as part of each field indicates the tier to which the program material being transmitted at that time belongs. Thus, when this information is evaluated at 260, the microprocessor is enabled to determine whether the viewer is entitled to view the particular program then being transmitted or not.

Moving to FIG. 20b, the pay-per-view bit is evaluated. This is not a bit transmitted as part of the system data, but is raised when the user presses the BUY button indicating that he wishes to purchase a program not part of the tier he has selected. If, as noted at 264, this bit is selected, the program identification is stored at 266 for subsequent auditing purposes and the cost of current program data transmitted as part of the system data as shown at 268 is used to add a suitable charge to a total termed Impulse Charges at noted at 270. In this way, pay-per-view programming is correctly billed to the user, and the program identification is stored such that a full billing report can be provided to the user later should he question his bill. At 272, the blackout code is compared to a number stored in the microprocessor assembly. If they match, the video is disabled. This has the effect of permitting the broadcaster from preventing certain individuals from seeing certain programs. For example, in some cases, the promoters of sporting events wish the event to be blacked out in the area of its venue, so as to not destroy ticket sales. In such case, their agreement with a broadcaster of a televised version of the event may require that a blackout of the local area be implemented. The blackout code provides this feature. At 276, the fingerprint trigger is evaluated. If it is on, the user identification number is caused to be written to the screen at 278. As noted, this permits a copy made from the version of the program being broadcast at this time to be traced to the individual who made the original copy.

Referring now to FIG. 20c, at 280 the general message bit is evaluated. If it is on, the microprocessor then requests MATS to grab the general message next transmitted by the broadcaster, as indicated at 282. If the pay-per-listen bit is on as indicated at 284, this means that a set of the audio channels are pay-per-listen channels. Thereafter, these channels are treated at 286 as a pay-TV program; that is, the tier authorizations are compared, the program identification is saved, and the cost of current program data is used, if the audio is selected using the BUY button. In this way, the audio in a pay-per-listen arrangement is treated for accounting purposes exactly as is a pay-per-view TV sale, thus simplifying the bookkeeping of the device. At 288, the scrambled program bit is evaluated. If the program is scrambled, the descrambler is enabled at 290. In this connection, it will be appreciated that "scrambling" and "encrypting" are used somewhat interchangeably in the art. Herein "scrambling" refers to such things as moving portions of the video signal, e.g., line translation, line rotation, moving of the color burst and so on, whereas "encryption" refers to mathematical algorithms carried out on the program, all generally as described below in connection with FIG. 22.

Returning to consideration of FIG. 20c, at 292 if the program is purchased using the buy button, the tracked program bit is checked; if this is raised, the program number is saved as indicated at 294 for subsequent use in customer bill verification, and the like.

It will be appreciated by those skilled in the art that the system data, as processed by MATS and supplied to the microprocessor, provides a way in which a large quantity of system-wide data can be readily transmitted to all the decoders in a given system at a very high repetition rate, such that the broadcaster can maintain very close control over the operation of the decoders, while not adding unduly to the signal bandwidth by requiring a great deal of the lines of the VBI to be tied up with this information. Other aspects and advantages of this arrangement will no doubt be clear to those of skill in the art, while some specific advantages provided thereby are also described below.

E. Use of Individual Subscriber Control Information

FIG. 21 shows schematically the use of the data supplied to each individual decoder by way of the addressed packet. For example, the credit update data supplied at 300 is used at 302 to update the credit status of the user. Suppose the user is alerted by his decoder that his credit is running low. He then transmits a payment to the broadcaster, either by sending the broadcaster a check, or by telephoning the broadcaster and using a credit card to secure additional credit. Of course, other ways of communicating payment to the broadcaster are also possible. However, in either case, the broadcaster transmits the credit update data as at 300 to the individual decoder by way of an addressed packet. The decoder detects the addressed packet by noting that a user address number provided at 74 (FIG. 13) is its own address, and copying the addressed packet to the microprocessor. The microprocessor then recognizes the addressed packet as being one which contains credit update data and uses that data to update its own stored information concerning the user's credit status, as at 302.

The credit status updates performed at 302 include such things as keeping track of the date of the subscriber's last payment and the last credit update number, such that if the credit update is transmitted again, the decoder can determine whether it has already received that credit update and whether the account has properly been adjusted. This prevents erroneous credit updates, while permitting the same credit update to be transmitted a number of times, so as to ensure its reliable receipt.

. Generally similarly, the program tiers which the user has selected are transmitted as part of the addressed packet as indicated at 304. The microprocessor stores these as indicated at 306 and uses them in comparison to the transmitted program tiers, transmitted as part of the system data as discussed above in connection with FIG. 20a to determine whether the user is entitled to see a particular program.

Billing data may also be transmitted as part of the addressed packet, as shown at 308. For example, if for some reason, the credit data and billing data should indeed be separate, these can be used to update the credit/billing status as indicated at 310.

The key-of-the-month is transmitted as part of the addressed packet as well, as indicated at 312, and the microprocessor stores this together with a bit indicating whether it is the odd or even key-of-the-month at 314; the key-of-the-month is used as discussed at length above in decoding of audio, video and teletext information.

Should there be a personal message for transmission to the user, the page of this personal message in the stream of teletext information is transmitted to the decoder as part of the addressed packet as indicated at 316. The microprocessor alerts the MATS to grab the indicated page as indicated at 318; it is then displayed on the screen as indicated above in connection with FIGS. 16–18.

Finally, should a memory patch be required, that is, should the individual decoder require an alteration to the information stored in its electrically erasable read-only memory, for example, to correct a template arrangement to indicate a new broadcaster, or to alter some other user-specific information which is transmitted by the broadcaster, the memory patch is transmitted at 320 as part of the addressed packet. Typically, the memory patch will include an indication of the location in memory which is to be changed, an indication of the number of bytes of memory to be changed, and the actual data to be substituted, all generally as conventional in the art. The memory patch data is then written to the EEPROM as indicated at 322.

F. Decryption

Figure 22:
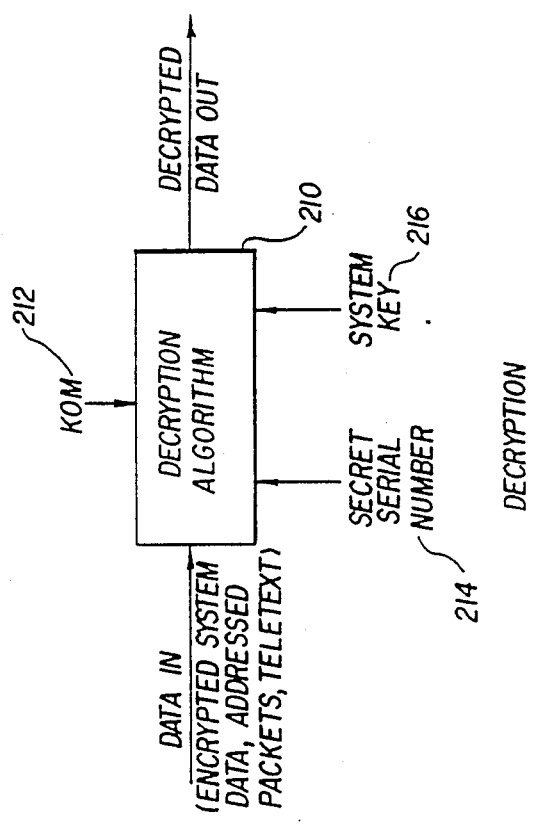
FIG. 22 shows generally the data decryption scheme according to the system of the invention.

Decryption is performed as indicated schematically in FIG. 22. The incoming data is supplied to a decryption algorithm as indicated at 210, as are one or more keys. The keys may comprise one of the several keys-of-the-month stored in EEPROM after supply to the decoder as part of an individually addressed packet, as noted at 212, the secret serial number sorted in the microprocessor at manufacture, as noted at 214, and/or the system key transmitted as part of the system data in line 3 of the VBI, as noted at 216.

The algorithm itself may comprise any one of a wide variety of decryption algorithms known to those of skill in the art, including that corresponding to the Data Encryption Standard ("DES") published by the National Bureau of Standards. The algorithm chosen is immaterial to the practice of the present invention. Suitable encryption techniques are similarly within the skill of the art. In the decoder, decryption is carried out most expediently in the microprogram processed by the microprocessor 114.

G. Further Advantages

The overall operation and design of the system of the invention having been described, and the decoder having been detailed, a number of additional aspects, objects, improvements and advantages of the system and decoder of the invention can now be explained more fully.

As discussed above, decryption of the complete B-MAC signal used according to this invention requires the secret serial number, which is written to the secure microprocessor at construction of the decoder, the service key, and the key-of-the-month. Probably the most vulnerable part of these is the key-of-the-month, which is transmitted frequently over a month's time. However, as noted, this capture of the KOM itself would not be adequate to decode the signal, since the service key and the secret serial number must also be captured. Moreover, the service key is obsoleted every 16 frames (approximately every one-third second) such that capturing it will only itself allow loss of 16 frames. This also has the advantage that the time required for key acquisition following a channel change is limited to this period of time, e.g., one-third second. Therefore, the subscriber does not see a substantial delay when he changes channels on his decoder.

As mentioned above, there are two types of control data transmitted according to the invention. A first type referred to as system data is intended for all users and is transmitted in every 16-field cryptocycle. The system data contains information which fully describes the services currently being transmitted. These include such matters as broadcaster identification, program number, program cost, program tier membership required to view a given program, current service keys and so forth.

By comparison, addressed packets are encrypted uniquely for an individual decoder, and contain individual-subscriber or user-specific information which fully describes the authorization of the decoder with respect to a specific broadcaster or broadcaster consortium for a given month. A number of broadcasters or broadcaster consortia may independently address the decoder [broadcaster consortia are broadcasters which have banded together to bill their services commonly], and maintain entirely separate billing systems. The addressed packets contain information such as consortium/broadcaster identification, message identification, authorized individual program numbers, authorized service tiers (text, audio, etc.), and credit updates.

Both types of control data packets, that is, system data and addressed packets, are encrypted during transmission using a highly secure algorithm. They are only decoded in a secure microprocessor which cannot be tampered with without destruction. The products of decryption are also stored in the EEPROM, which cannot be read, due to the construction of the secure microprocessor, detailed below. The contents of the system data packet, which specifies the on-air program tier, are then compared with the authorized tiers for the particular decoder (which are decrypted from an addressed packet transmitted on a monthly basis). The services which are authorized for reception by the decoder are derived from this comparison. Impulse purchase, wherein the subscriber specifically indicates to the decoder that he wishes to purchase a single program, is also possible; in this case, the decoder simply bypasses the tier comparison. The appropriate service keys are then decrypted and released from the secure microprocessor for use in decoding the video and audio signals. This process is repeated in each 16-frame cryptocycle.

The microprocessor used according to the preferred embodiment of the invention is referred to as "secure". This is because it is logically necessary for a subscription-television decoder to have an element of physical security. That is, if an unauthorized unit can be modified to be identical to an authorized unit, then the system is insecure, and the broadcaster will lose revenue. Preferably, the only difference between an unauthorized unit and an authorized unit is in the contents of one or more memories. This is because it is highly desirable to avoid having to provide physically different microprocessors, etc., for individual decoders. This would be highly cost-inefficient.

It is essentially straightforward to protect services during transmission by encrypting the service keys and by rapidly changing the service keys in a random manner. The main security problem arises in protecting the service keys from compromise during distribution.

For that purpose, a device is required with the following characteristics:
(1) capable of highly sophisticated decryption techniques;
(2) factory programmable;
(3) immune to modification or copying; and
(4) including protected non-volatile memory.

It is now a routine operation to copy conventional custom integrated circuits, and companies exist which specialize in this activity. Therefore, a non-copyable device is required. Specifically, a Motorola No. MC68HC11 microprocessor, originally developed for use in automotive applications and the like, which includes a protected internal non-volatile memory, is used for storage and processing of keys and credit information in the embodiment of the decoder of the invention described in detail above. In a slightly different embodiment of the decoder used in commercial application, e.g. for inter-company video communication and the like, the Motorola Model No. MC68705U5 is used instead.

In a typical microprocessor, the address bus and data bus are available externally to be monitored and modified. Access can thereby be gained to the decryption process and to the contents of any memory connected to the bus. The processor used according to the present invention is operable in a secure mode in which the bus connection contacts are reassigned to other functions and in which the bus is not available externally for any purpose. In this condition, the internal non-volatile memory (the EEPROM) cannot be read by any known means. All input control packets can be securely encrypted. Decrypted service keys for the authorized services are released only for the microprocessor's immediate use, and are valid for only sixteen frames, that is, for approximately one-third second. Therefore, discovery of any particular decrypted service key is of minimal use. Within the microprocessor, the secure information is stored as a charge pattern and cannot be read, even using an electron microscope. The charge pattern is lost during any physical assault using probes.

According to another important aspect of this invention, the billing system and the user interface can be defined by software, such that the system can be modified "over the air" as needed by broadcasters without modification to the hardware.

As described above, the service data which is transmitted system-wide at cryptocycle intervals includes identification by service tier of the program currently being transmitted. The addressed packets, which are sent to each decoder from time to time, include tier identifications, indicating which programs the individual subscriber is authorized to view. This provides substantial flexibility in programming control and in billing, because each subscriber can separately select those programs which he wishes to view. The choice is effectively among literally hundreds of different programs to be made available by a broadcaster or a consortium of broadcasters.

The tier concept also allows the subscriber to enjoy a temporary tier assignment. For example, when he wishes to watch a particular sporting event, he can contact the broadcaster and arrange to have that tier made available to him for the period of time required. According to an important aspect of the invention, the decoder is also enabled to respond to the pressing of a "BUY" button by the subscriber, to indicate that he wishes to purchase a particular program at a particular time; the subscriber's credit is then simply debited by the cost of the program.

All this is made readily possible and user-friendly by the use of the menu-driven user interface. That is, the fact that the teletext messages are continually being transmitted by the broadcaster and may be selected by the decoder in response to user or microprocessor initiated requests gives significant flexibility in the user/decoder interface. As discussed above in connection with FIG. 17, the provision of teletext pages selected by the microprocessor in accordance with the user's input from the key pad allows a properly programmed microprocessor to lead the user through a wide variety of sequences of screens, thus providing any control sequence deemed desirable to ensure that the various needs of the various users of the system are satisfied. The microprocessor microprogram selects the text pages displayed from the stream of pages transmitted, and uses the user's response to determine the next page to be shown.

For example, suppose the user wishes to have a babysitter watch his children in his house for the evening. The system can readily be provided with means requiring the input of a specific user identification number before it will accept input from a "BUY" button, such that the babysitter is prevented from purchasing a number of expensive programs. The tiers can similarly be defined such that only authorized users can access certain classes of programs, e.g., X-rated movies, such that the user need not be concerned that his children are watching subject matter he considers inappropriate; when he subscribes, he is given a personal user identification number which he need simply input responsive to a "prompt" from the decoder appearing on his screen when he desires to watch such material.

Furthermore, use of the tier concept allows each broadcaster to define the program tiers in any manner he deems desirable; he is not constrained by system design to assign all first run movies to channel A, all blue movies to channel B, all high-priced sporting events to channel C, public television to channel D, and so on; the system can be reconfigured as needed. Moreover, the data stored in the electrically erasable programmable read only memory which controls the assignment of tiers, that is, the correlation between the buttons of the key pad and the programs which are viewed, can be varied by the broadcaster at any time through the use of the addressed packets. That is, an individual "memory patch" message can be sent to a decoder indicated that a particular item stored in the EEPROM is to be changed. The memory patch feature also permits updating of templates, as the EEPROM contains information concerning where certain user-specific data is to be placed on the screen in conjunction with a particular template. In the same way the actual data to be shown in connection with a particular template can be updated.

Another improvement in control of the use of a copyrighted signal which is rendered straightforward by the method of the present invention is as follows. Those of skill in the art will recognize that, in general, it is possible for a subscriber with a video cassette recorder (VCR) to make a copy of substantially any program material transmitted. This has the obvious defect that the copyright proprietor tends to lose control of his subject matter. It is particularly exacerbated by the fact that at present there is no convenient way of locating the original copyist, that is, the individual who made the original copy of the copyrighted material using his VCR. According to the present invention, it is readily possible to set a flag bit in the system data portion of the signal, which, when detected by the microprocessor, will cause it to write the subscriber identification number to the screen via the teletext processing facility. Typically, this will be done at a particular point in a particular program. Thereafter, the copyright proprietor, having located an illegal copy of his copyrighted work made during its transmission over the system of the invention, can readily detect the user's identification number and thus track down the maker of the offensive copy. At the same time, the insertion of the user identification on the screen for but a single frame is barely detectable to the subscriber's eye, such that no significant impairment in picture quality results from implementation of this expedient.

While a preferred embodiment of the invention has been described in detail, this should not be taken as a limitation on the scope of the invention, but merely as exemplary thereof. Numerous additional improvements and modifications can be made to the system of the invention as described above without departure from its essential spirit and scope. Therefore, the present invention is not to be limited by the above disclosure, but only by the following claims.

We claim:

1. A method of transmitting individual data in packets to plural decoders of a television subscription system, each decoder receiving the same addressed data packet, said method comprising the steps of:
   assigning groups of decoders to membership in banks of decoders;
   assigning a bank identification number address to all decoders in a given bank of decoders;
   assigning an individual member code comprising n bits to each of the decoders in each bank;
   transmitting an addressed data packet including said bank identification number address to the decoders of said bank, said data packet including a data field, said data field having a predetermined format of at least $2^n$ packet enable bits wherein the number of packet enable bits $2^n$ is equal to or greater than the number of decoders assigned to a given bank, values of said bits in said data field being assigned to convey data to be transmitted to said plural decoders; and
   using said individual member code to point to one or more packet enable bits in said data field for status interpretation at said decoder to which said individual member code is assigned.

2. The method of claim 1, additionally comprising the step of:
   assigning a unique address to each decoder which is not a member of a bank of decoders.

3. The method of claim 2, wherein said addressed message is transmitted as a line in a vertical banking interval of a composite signal in a subscription television system, said composite signal including an audio portion comprising plural audio channels, a video portion, and individual-decoder and system-wide control information, said addressed message being transmitted as part of said individual decoder control information.

4. The method of claim 3, wherein said composite signal comprises an endless series of fields, each field comprising a number of lines, each line including a horizontal blanking interval portion, a first group of lines of each field also including a vertical blanking interval and the remainder of the lines of each field also including the video portion of said composite signal wherein the bank identification number address designates a particular audio channel.

5. The met hod of claim 4, wherein said individual decoder and system-wide control information is transmitted during said vertical blanking interval.

6. The method of claim 4, wherein said audio portion of said signal is transmitted during said horizontal blanking interval and said particular audio channel carries a particular language.

7. The method of claim 1, wherein the data field comprises at least a first and a second grip group of bits.

8. The method of claim 7, wherein the first group of bits and the second group of bits both contain the same number of bits, a bit in said first group of bits and a bit in said second group of bits uniquely corresponding to a decoder in the bank.

9. The method of claim 7, wherein the second group of bits comprises individual messages to individual members of the bank.

10. The method of claim 1, wherein, when the interpreted status of the one or more packet enable bits pointed to by said individual member code for a decoder is set, functions corresponding to remaining data packet fields are enabled.

11. The method of claim 10, wherein the functions comprise program tier functions, memory functions, credit functions, billing functions or personal message functions.

12. The method of claim 1, wherein, when the status of the one or more packet enable bits pointed to by said individual member code for a decoder is set, status interpretation of one bit messages in a remaining data packet field for the decoder is enabled.

13. A television subscription system capable of transmitting individual data to a plurality of decoders, the plurality of decoders being arranged individually or in banks of decoders, each decoder receiving the same addressed message, said system comprising:
   transmission means for transmitting individual data to a plurality of decoders, said transmission means capable of transmitting an addressed message, said addressed message including a bank identification number address and a data field having a predetermined format of bits, wherein the number of bits in the data field is equal to or greater than the number of decoders assigned to a given bank, values of the bits in the data field being assigned in accordance with data to be transmitted to specific individual decoders; and
   a plurality of decoders, each of said plurality of decoders comprising:
      individual member code storage means for storing an individual member code assigned to a given decoder;
      bank identification storage means for storing a bank identification number which may be assigned to a given decoder; and
      message reception means connected to the transmission means, the individual member code storage means and the bank identification number storage means for receiving addressed message data sent from the transmission means to the decoders, said message reception means recognizing selected bits in the data field, recognition being performed using the individual member code stored in the individual member code storage means of said given decoder to identify in said data field at least one bit intended for said given decoder assigned to the individual member code.

* * * * *